United States Patent
Myoki et al.

(10) Patent No.: US 7,610,368 B2
(45) Date of Patent: Oct. 27, 2009

(54) SERVER APPARATUS, METHOD FOR CONTROLLING THE SAME, AND COMPUTER PROGRAM

(75) Inventors: Yutaka Myoki, Tokyo (JP); Masanori Saito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1110 days.

(21) Appl. No.: 10/835,331

(22) Filed: Apr. 28, 2004

(65) Prior Publication Data

US 2004/0226037 A1   Nov. 11, 2004

(30) Foreign Application Priority Data

May 7, 2003   (JP)   ............... 2003-129044

(51) Int. Cl.
*G06F 15/173* (2006.01)
(52) U.S. Cl. .................. 709/223; 709/203; 705/227
(58) Field of Classification Search .............. 709/201, 709/203, 223; 705/26, 27; 715/205
See application file for complete search history.

(56) References Cited

U.S. PATENT DOCUMENTS 5,983,351 A * 11/1999 Glogau ................. 726/26
2002/0051189 A1 * 5/2002 Usami ................. 358/1.15
2002/0069222 A1 * 6/2002 McNeely ................. 707/513
2003/0158792 A1 * 8/2003 Perkowski ................. 705/27
2004/0098288 A1 * 5/2004 Minakuchi ................. 705/7
2006/0052888 A1 * 3/2006 Bayoumi et al. ............... 700/95

* cited by examiner

*Primary Examiner*—Oanh Duong
(74) *Attorney, Agent, or Firm*—Canon U.S.A., Inc., IP Division

(57) ABSTRACT

A server apparatus, a method for controlling the server apparatus, and computer-executable process steps for causing a computer to perform the method, for constructing an on-line sales system appropriate for a creator and sells a commercial item including a content without imposing, on the creator, the workload involved in the construction and operation of the on-line sales system, and without the risk of stocking unsold commercial items. More specifically, a support server receives, from a creator terminal, information relating to the commercial item that is produced by outputting the content based on commercial item information, sets an address of a location of each commercial item on a network, and sends page data containing the address to an orderer terminal. Upon receiving location information represented by the address from the orderer terminal, the support server outputs a command to an output apparatus to produce the commercial item.

2 Claims, 36 Drawing Sheets

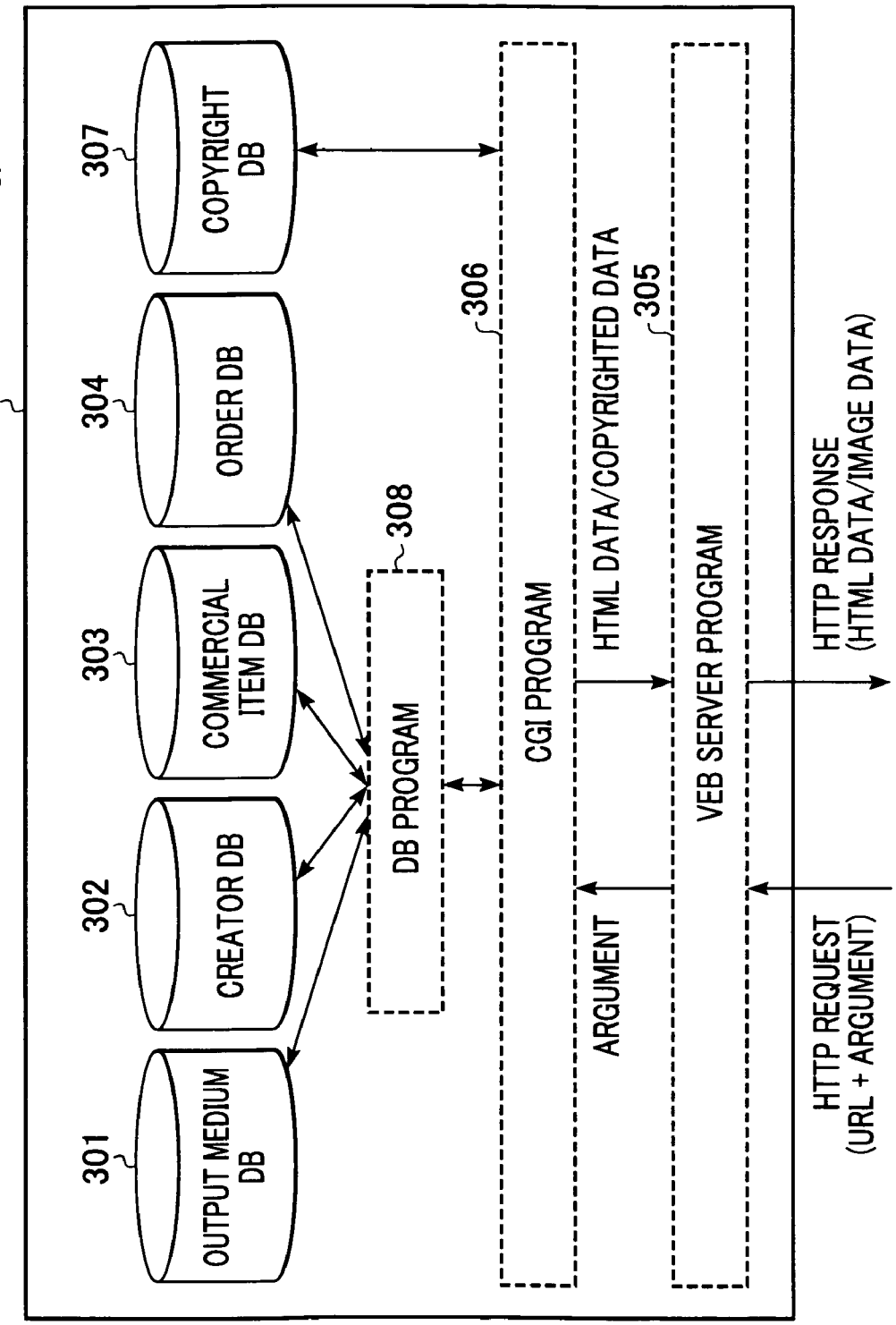

FIG. 4

| PURPOSE OF CGI | URL | CGI PROGRAM NAME | PROCESS | |
|---|---|---|---|---|
| CREATOR ON-LINE REGISTRATION | http://www.server.jp/cgi/welcome1 | welcome1 | DISPLAY OF REGISTRATION CONTENT INPUT SCREEN | ~401 |
| | http://www.server.jp/cgi/welcome2 | welcome2 | REGISTRATION PROCESS | ~402 |
| CREATOR COMMERCIAL ITEM REGISTRATION | http://www.server.jp/cgi/creator1 | creator1 | DISPLAY OF LOG-IN SCREEN | ~403 |
| | http://www.server.jp/cgi/creator2 | creator2 | LOG-IN PROCESS | ~404 |
| | http://www.server.jp/cgi/creator3 | creator3 | REGISTRATION PROCESS OF COMMERCIAL ITEM | ~405 |
| ORDER BY ORDERER | http://www.server.jp/cgi/view | view1 | DISPLAY OF SALES SCREEN | ~406 |
| | http://www.server.jp/cgi/order1 | order1 | PUT COMMERCIAL ITEM INTO CART | ~407 |
| | http://www.server.jp/cgi/order2 | order2 | ORDER CONTENT IN CART FOR PURCHASING | ~408 |
| ACQUISITION OF THUMBNAIL | http://www.server.jp/cgi/getThumb | getThumb | ACQUISITION OF THUMBNAIL | ~409 |

FIG. 5

| COPYRIGHTED DATA | FILE PATHNAME | /var/images/creator ID/commercial item ID/file name | ~501 |
|---|---|---|---|
| THUMBNAIL | FILE PATHNAME | /var/thumbs/creator ID/commercial item ID/file name | ~502 |
| COPYRIGHTED DATA | ACQUIRED URL | http://www.server.jp/cgi/getThumb ? cid = creator ID & pid = commercial item ID | ~503 |

FIG. 8
| | FILE PATHNAME | IMAGE | IMAGE SIZE (PIXELS IN HEIGHT × PIXELS IN WIDTH) | |
|---|---|---|---|---|
| COPYRIGHTED DATA | c:/images/image1.jpg |  | 1200 × 800 | ~801 |
| | c:/images/image2.jpg |  | 800 × 600 | ~802 |
| THUMBNAIL | c:/thumbs/thumb1.jpg |  | 60 × 40 | ~803 |
| | c:/thumbs/thumb2.jpg |  | 60 × 45 | ~804 |

FIG. 9

| | |
|---|---|
| OUTPUT MEDIUM CODE (PK) | ~901 |
| OUTPUT MEDIUM NAME | ~902 |
| COST (MINIMUM SELLING PRICE) | ~903 |
| PERMISSIBLE RESOLUTION (HEIGHT) | ~904 |
| PERMISSIBLE RESOLUTION (WIDTH) | ~905 |
| NAME OF UNIT OF ORDERS | ~906 |
| NAME OF UNIT OF COMMERCIAL ITEMS | ~907 |
| NUMBER OF COMMERCIAL ITEMS PER PURCHASE ORDER | ~908 |

FIG. 10

| OUTPUT MEDIUM CODE (PK) | OUTPUT MEDIUM NAME | COST (MINIMUM SELLING PRICE) ($) | PERMISSIBLE RESOLUTION (PIXELS IN HEIGHT) | PERMISSIBLE RESOLUTION (PIXELS IN WIDTH) | NAME OF UNIT OF ORDERS | NAME OF UNIT OF COMMERCIAL ITEMS | NUMBER OF COMMERCIAL ITEMS PER PURCHASE ORDER |
|---|---|---|---|---|---|---|---|
| TS-W-S | T-SHIRT (WHITE) SMALL SIZE | 30 | 1200 | 800 | SET | UNIT | 1 |
| TS-W-M | T-SHIRT (WHITE) MEDIUM SIZE | 30 | 1200 | 800 | SET | UNIT | 1 |
| TS-W-L | T-SHIRT (WHITE) LARGE SIZE | 30 | 1200 | 800 | SET | UNIT | 1 |
| PST-N-A0 | POSTER (GLOSSY PAPER) A0 | 100 | 8000 | 6000 | SET | SHEET | 1 |
| PST-L-A0 | POSTER (LAMINATE) A0 | 100 | 8000 | 6000 | SET | SHEET | 1 |
| PC | POST CARD | 5 | 800 | 600 | SET | SHEET | 5 |
| MC-W | MUG CUP (WHITE) | 35 | 800 | 600 | SET | UNIT | 1 |
| MC-BLK | MUG CUP (BLACK) | 35 | 800 | 600 | SET | UNIT | 1 |

| PK | |
|---|---|
| | CREATOR ID (PK) ~1101 |
| | PASSWORD ~1102 |
| | CREATOR NAME ~1103 |
| | POSTAL CODE ~1104 |
| | ADDRESS ~1105 |
| | TELEPHONE NUMBER ~1106 |
| | MAIL ADDRESS ~1107 |
| | PAYMENT DESTINATION BANK ~1108 |
| | PAYMENT DESTINATION BANK DEPOT ~1109 |
| | TYPE OF ACCOUNT AT PAYMENT DESTINATION BANK ~1110 |
| | ACCOUNT NUMBER AT PAYMENT DESTINATION BANK ~1111 |
| | NAME OF HOLDER OF ACCOUNT ~1112 |

FIG. 12

| PK | CREATOR ID (FK : 1101) | ~1201 |
|---|---|---|
| PK | COMMERCIAL ITEM ID | ~1202 |
| | OUTPUT MEDIUM CODE (FK : 901) | ~1203 |
| | COPYRIGHT NAME | ~1204 |
| | THUMBNAIL FILE NAME | ~1205 |
| | SELLING PRICE | ~1206 |

FIG. 13

| PK | | |
|---|---|---|
| | ORDER ID | ~1301 |
| | CREATOR ID (FK : 1101) | ~1302 |
| | DELIVERY DESTINATION ADDRESS | ~1303 |
| | NAME OF ADDRESSEE | ~1304 |
| | TELEPHONE NUMBER OF ADDRESSEE | ~1305 |
| | COMMERCIAL ITEM ID#1 (FK : 1202) | ~1306-1 |
| | NUMBER OF ORDERED UNITS #1 | ~1307-1 |

⋮

| | |
|---|---|
| COMMERCIAL ITEM #n (FK : 1202) | ~1306-n |
| NUMBER OF ORDERED UNITS #n | ~1307-n |
| SUM OF PURCHASE | ~1310 |
| CONSUMPTION TAX | ~1311 |
| SUM OF COSTS | ~1312 |
| ORDER FLAG {OFF|ON} | ~1313 |

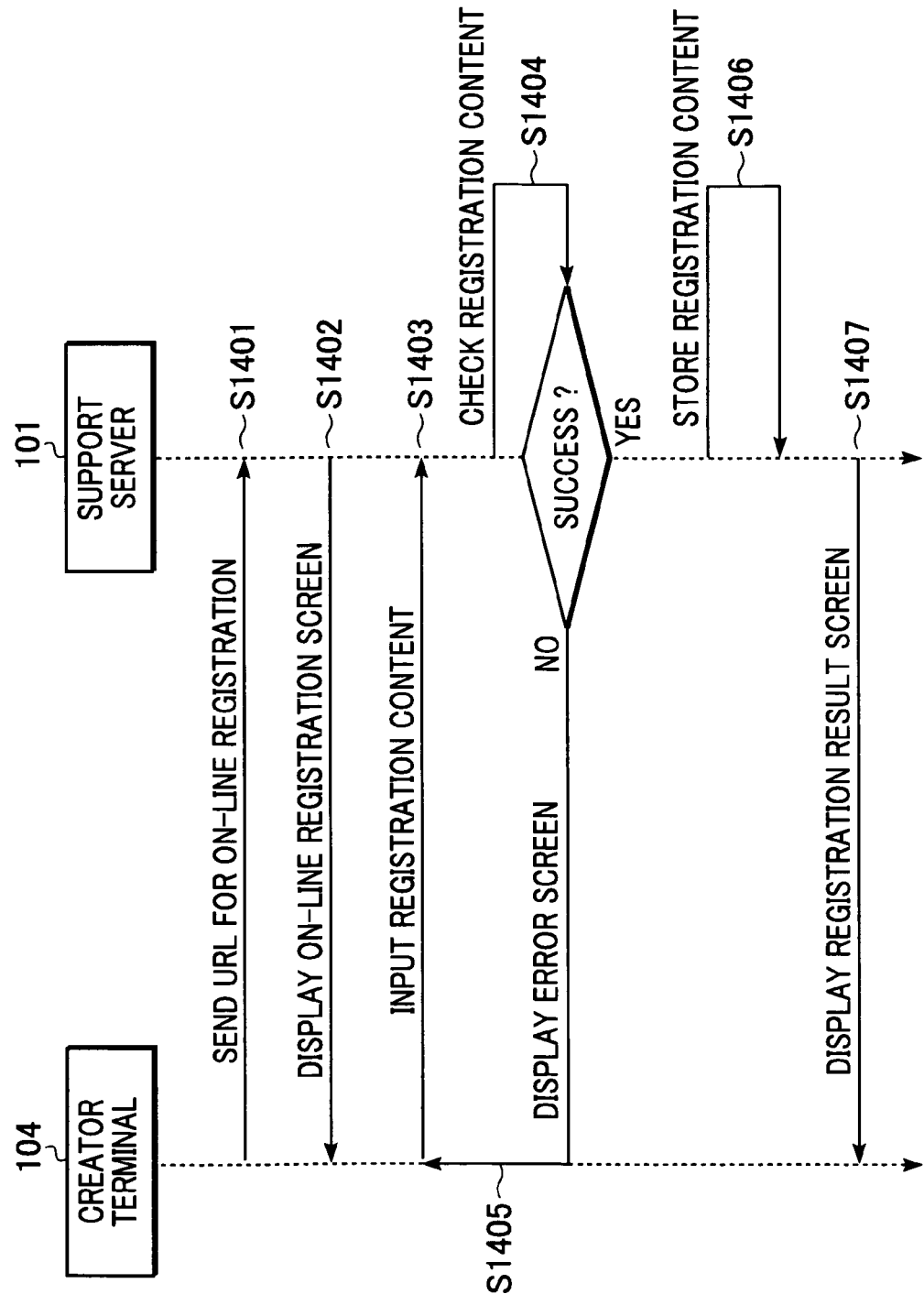

WELCOME TO CREATOR REGISTRATION !
FILL IN FOLLOWING FORM AND PRESS OK BUTTON

| Field | | |
|---|---|---|
| CREATOR ID DESIRED | | 1501 |
| PASSWORD | | 1502 |
| NAME | | 1503 |
| POSTAL CODE | | 1504 |
| ADDRESS | | 1505 |
| TELEPHONE NUMBER | | 1506 |
| MAIL ADDRESS | | 1507 |
| PAYMENT DESTINATION BANK | | 1508 |
| PAYMENT DESTINATION BANK DEPOT | | 1509 |
| TYPE OF ACCOUNT AT PAYMENT DESTINATION BANK | ○ ORDINARY ACCOUNT   ○ CHECKING ACCOUNT | 1510 |
| ACCOUNT NUMBER AT PAYMENT DESTINATION BANK | | 1511 |
| NAME OF HOLDER OF ACCOUNT | | 1512 |

```
                    1600
┌─────────────────────────────────────────────────┐
│         WELCOME TO CREATOR REGISTRATION !        │
│      FILL IN FOLLOWING FORM AND PRESS OK BUTTON  │
│                                                  │
│   CREATOR ID DESIRED    [xxx]              —1601│
│                                                  │
│   PASSWORD              [****]             —1602│
│                                                  │
│   NAME                  [xxxx]             —1603│
│                                                  │
│   POSTAL CODE           [146-8501]         —1604│
│                                                  │
│   ADDRESS               [SHIMOMARUKO OHOTA-KU TOKYO] —1605│
│                                                  │
│   TELEPHONE NUMBER      [03-xxxx-xxxx]     —1606│
│                                                  │
│   MAIL ADDRESS          [xxx@creator.jp]   —1607│
│                                                  │
│   PAYMENT DESTINATION BANK   [xxx BANK]    —1608│
│                                                  │
│   PAYMENT DESTINATION BANK DEPOT  [SHIMOMARUKO DEPOT] —1609│
│                                                  │
│   TYPE OF ACCOUNT AT PAYMENT  ● ORDINARY  ○ CHECKING —1610│
│   DESTINATION BANK              ACCOUNT     ACCOUNT │
│                                                  │
│   ACCOUNT NUMBER AT PAYMENT   [1234567890] —1611│
│   DESTINATION BANK                              │
│                                                  │
│   NAME OF HOLDER OF ACCOUNT   [xxxx]       —1612│
│                                                  │
│                      [  OK  ]—1613              │
└─────────────────────────────────────────────────┘
```

| | | |
|---|---|---|
| CREATOR ID | xxx | 1701 |
| PASSWOED | ***** | 1702 |
| NAME | xxxx | 1703 |
| POSTAL CODE | 146-8501 | 1704 |
| ADDRESS | SHIMOMARUKO OHOTA-KU TOKYO | 1705 |
| TELEPHONE NUMBER | 03-xxxx-xxxx | 1706 |
| MAIL ADDRESS | xxx@creator.jp | 1707 |
| PAYMENT DESTINATION BANK | xxx BANK | 1708 |
| PAYMENT DESTINATION BANK DEPOT | SHIMOMARUKO DEPOT | 1709 |
| TYPE OF ACCOUNT AT PAYMENT DESTINATION BANK | ORDINARY ACCOUNT | 1710 |
| ACCOUNT NUMBER AT PAYMENT DESTINATION BANK | 1234567890 | 1711 |
| NAME OF HOLDER OF ACCOUNT | xxxx | 1712 |

RESULTS OF COMMERCIAL ITEM REGISTRATION
COMMERCIAL ITEM IS REGISTERED AS FOLLOWS:

OUTPUT MEDIUM    T-SHIRT (WHITE) SMALL SIZE ~2401

THUMBNAIL  ~2402

SELLING PRICE    $40 ~2403

| CREATOR ID | COMMERCIAL ITEM ID | OUTPUT MEDIUM CODE | FILE NAME OF COPYRIGHTED DATA | THUMBNAIL FILE NAME | SELLING PRICE |
|---|---|---|---|---|---|
| | | | | | ~2501 |
| xxx | 1001 | TS-W-S | image1.jpg | thumb1.jpg | 40 |
| | | | | | ~2502 |
| xxx | 1002 | TS-W-M | image1.jpg | thumb1.jpg | 40 |
| | | | | | ~2503 |
| xxx | 1003 | TS-W-L | image1.jpg | thumb1.jpg | 40 |
| | | | | | ~2504 |
| xxx | 1004 | PC | image2.jpg | thumb2.jpg | 7 |

FIG. 31

| | | |
|---|---|---|
| ORDER ID | 1001 | 3101 |
| CREATOR ID | xxx | 3102 |
| ADDRESS OF DELIVERY DESTINATION | | 3103 |
| NAME OF ADDRESSEE | | 3104 |
| TELEPHONE NUMBER OF ADDRESSEE | | 3105 |
| COMMERCIAL ITEM ID#1 | 1002 | 3106-1 |
| QUANTITY #1 | | 3107-1 |
| COMMERCIAL ITEM ID#1 | 1004 | 3106-2 |
| QUANTITY #2 | | 3107-2 |
| SUM OF PURCHASE ($) | | 3110 |
| CONSUMPTION TAX ($) | | 3111 |
| TOTAL SUM ($) | | 3112 |
| ORDER FLAG | OFF | 3113 |

FIG. 32

| | | |
|---|---|---|
| ORDER ID | 1001 | ~3201 |
| CREATOR ID | xxx | ~3202 |
| ADDRESS OF DELIVERY DESTINATION | IMAIUEMACHI NAKAHARA-KU KAWASAKI-SHI | ~3203 |
| NAME OF ADDRESSEE | HANAKO KOSUGI | ~3204 |
| TELEPHONE NUMBER OF ADDRESSEE | 044-xxx-xxxx | ~3205 |
| COMMERCIAL ITEM ID#1 | 1002 | ~3206 |
| QUANTITY #1 | 2 | ~3207 |
| COMMERCIAL ITEM ID#1 | 1004 | ~3208 |
| QUANTITY #2 | 1 | ~3209 |
| SUM OF PURCHASE ($) | 87 | ~3210 |
| CONSUMPTION TAX ($) | 4 | ~3211 |
| TOTAL SUM ($) | 6500 | ~3212 |
| ORDER FLAG | ON | ~3213 |

FIG. 34

```
                                                              3400
┌─────────────────────────────────────────────────────────────┐
│   ADDRESS OF          ┌──────────────────────────────┐      │
│   DELIVERY DESTINATION└──────────────────────────────┘~3409 │
│   NAME OF ADDRESSEE   ┌──────────────────────────────┐~3410 │
│                       └──────────────────────────────┘      │
│   TELEPHONE NUMBER OF ┌──────────────────────────────┐~3411 │
│   ADDRESSEE           └──────────────────────────────┘      │
│                              ┌─────────┐                    │
│                              │  ORDER  │~3412               │
│                              └─────────┘                    │
└─────────────────────────────────────────────────────────────┘
```

FIG. 35

| ORDER ID | 1001 |
|---|---|
| CREATOR ID | xxx |
| ADDRESS OF DELIVERY DESTINATION | Imaiuemachi Nakahara-ku Kawasaki-shi ←3503 |
| NAME OF ADDRESSEE | Hanako Kosugi ←3504 |
| TELEPHONE NUMBER OF ADDRESSEE | 044-733-6111 ←3505 |
| COMMERCIAL ITEM ID#1 | 1002 |
| QUANTITY #1 | 2 |
| COMMERCIAL ITEM ID#1 | 1004 |
| QUANTITY #2 | 1 |
| SUM OF PURCHASE ($) | |
| CONSUMPTION TAX ($) | |
| TOTAL SUM ($) | |
| ORDER FLAG | OFF |

SERVER APPARATUS, METHOD FOR CONTROLLING THE SAME, AND COMPUTER PROGRAM

BACKGROUND OF THE INVENTION

1. Field of the Invention

The present invention relates to a server apparatus that supplies, under a network environment, a commercial item containing an output medium with copyrighted data attached thereto. The present invention also relates to a method for controlling the server apparatus and a computer program for causing a computer to perform the control method.

2. Description of the Related Art

Commercial items containing digital copyrighted contents, such as pictures, music, etc. produced by illustrators, photographers, writers, etc. (hereinafter collectively referred to as creator) are sold on-line. The creator must construct and operate an on-line sales system for purchase order management, inventory management, and shipment management. This results in an increase in workload for the creator, who is typically a non-specialist in the field of on-line sales system and may have difficulty in the construction and operation of the on-line sales system.

SUMMARY OF THE INVENTION

Accordingly, it is an object of the present invention to provide a server apparatus that constructs an on-line sales system appropriate for a creator. In addition, the server apparatus sells a commercial item including a content without imposing on the creator any of the workload involved in the construction and operation of the on-line sales system, and without the risk of stocking unsold commercial items. It is also an object to provide a method for controlling the server apparatus, and a computer program for causing a computer to perform the control method.

The present invention in one aspect relates to a method for controlling a server apparatus that executes a process for manufacturing a commercial item by outputting content data based on commercial item information. The method includes a step for receiving the commercial item information from a first information processing apparatus, a step for setting an address of a location of each commercial item on a network, a step for sending page data containing the address to a second information processing apparatus, and a step for issuing, to an output apparatus, a command for manufacturing the commercial item after location information represented by the address is received from the second information processing apparatus.

The method preferably includes a step for issuing, to a delivery system, a command for delivering the commercial item to be manufactured.

The method preferably includes a step for issuing, to a billing system, a command for performing a billing process for the commercial item to be manufactured.

The content data may be received by establishing connection to the address of the content data represented by the location information on the network.

The page data preferably contains display information for causing the second information processing apparatus to display information relating to at least one of the commercial item and the selling price of the commercial item.

The page data preferably contains information for causing the second information processing apparatus to receive at least one of the inputs of an order quantity for the commercial item, a delivery destination of the commercial item, a name of the addressee of the commercial item, and a telephone number of the addressee.

The page data preferably contains HTML data, and the page data is preferably analyzed and reproduced by the second information processing apparatus that has received a command from a Web browser.

The present invention in another aspect relates to a computer program for controlling a server apparatus that executes a process for manufacturing a commercial item by outputting content data based on commercial item information. The computer program includes program codes for performing a step for receiving the commercial item information from a first information processing apparatus, a step for setting an address of a location of each commercial item on a network, a step for sending page data containing the address to a second information processing apparatus, and a step for issuing, to an output apparatus, a command for manufacturing the commercial item after location information represented by the address is received from the second information processing apparatus.

The present invention in a third aspect relates to a server apparatus for executing a process for manufacturing a commercial item by outputting content data based on commercial item information. The server apparatus includes a unit for receiving the commercial item information from a first information processing apparatus, a unit for setting an address of a location of each commercial item on a network, a unit for sending page data containing the address to a second information processing apparatus, and a unit for issuing, to an output apparatus, a command for manufacturing the commercial item after location information represented by the address is received from the second information processing apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a block diagram of a support server.

FIG. 4 illustrates the types of CGI programs, mapping to URL, and program names in the support server.

FIG. 5 illustrates a storage destination of an image file, a file path of a thumbnail image, and mapping to an acquired URL in the support server.

FIG. 8 illustrates copyrighted data and a thumbnail image in the creator terminal.

FIG. 9 illustrates the structure of an output medium database (DB) table.

FIG. 10 illustrates the content of registration records of the output medium DB.

FIG. 11 illustrates the structure of a creator DB table.

FIG. 12 illustrates the structure of a commercial item DB table.

FIG. 13 illustrates the structure of an order DB table.

FIG. 14 illustrates a creator registration sequence.

FIG. 15 illustrates a creator registration screen.

FIG. 16 illustrates an input example of the creator registration screen.

FIG. 17 illustrates the content of a registration record of the creator DB.

FIG. 25 illustrates the content of a record of the commercial item registration.

FIG. 31 illustrates the content of registration of an order DB.

FIG. 32 illustrates the content of the registration of the order DB.

FIG. 34 illustrates a delivery destination screen.

FIG. 35 illustrates the content of the registration of the order DB.

DESCRIPTION OF THE PREFERRED EMBODIMENTS

Figure 1:
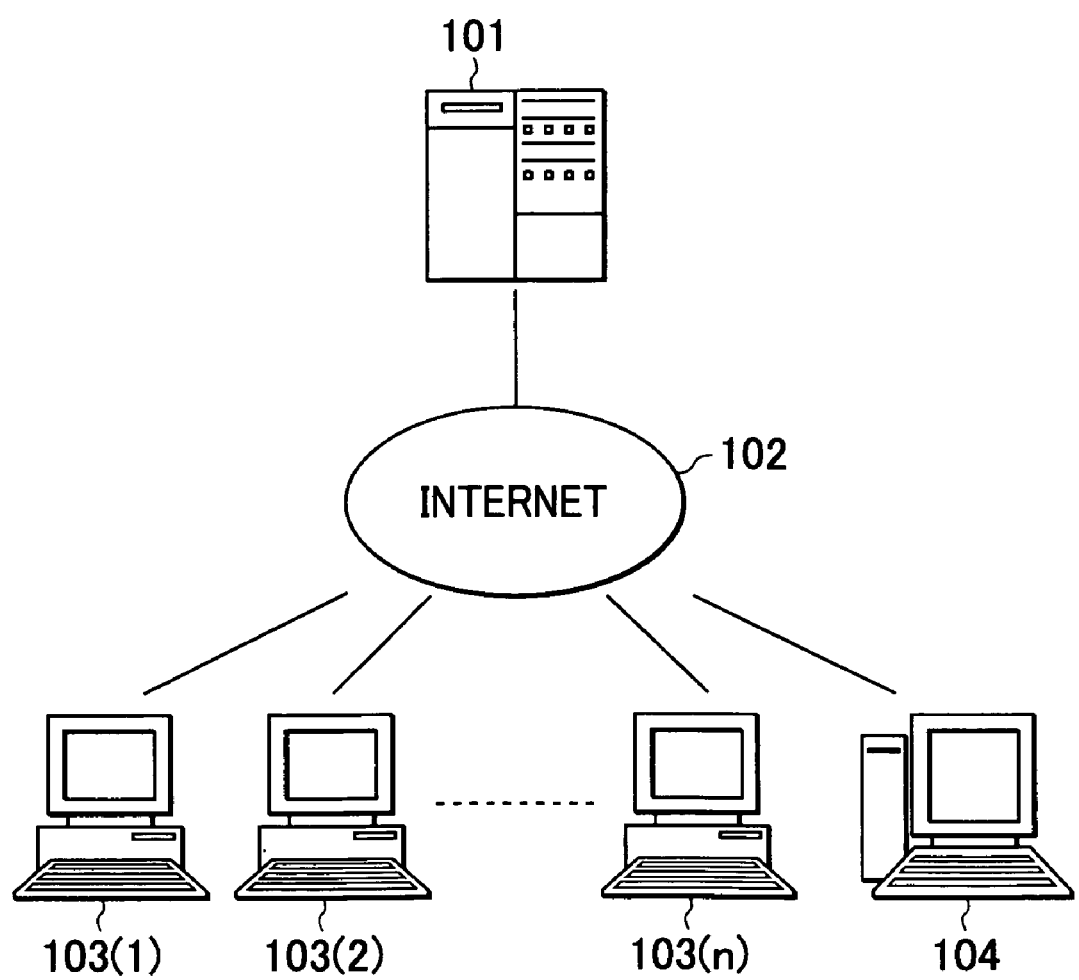
FIG. 1 generally illustrates the structure of an on-line sales system.

Referring to the drawings, the preferred embodiments of the present invention are described in detail. The elements to be discussed with reference to the preferred embodiments are discussed for exemplary purposes only, and are not intended to limit the scope of the present invention.

All domain names (i.e., FQDNs: Fully Qualified Domain Names) described here are intended to identify apparatuses, and are not related to real domain names.

First Preferred Embodiment

The entire structure of a sales system of a first preferred embodiment of the present invention is discussed first with reference to FIG. 1.

A support server 101 receives orders for commercial items that are produced by outputting copyrighted data such as illustrations, photographs, or music to an output medium such as a T-shirt, a mug cup, or a CD-R. The support server 101 communicates with one of an orderer terminal 103 and a creator terminal 104 via the Internet 102.

An orderer uses orderer terminals 103(1), 103(2), . . . 103(n) to place an order for a commercial item.

The creator uses the creator terminal 104 to create the copyrighted data such as illustrations, photographs, or music, to produce Web page data to be presented to the orderer, and to communicate with the support server 101 for exchange of a variety of pieces of information.

The support server 101, the orderer terminal 103, and the creator terminal 104 include at least one respective computer 200 (FIG. 2), and communicate with one another via the Internet 102.

The Internet 102 is used in the first preferred embodiment. Alternatively, any network, such as a local area network (LAN), may be used as long as the network is a medium that permits data to be transmitted and received.

Referring to FIGS. 2 through 8, the sales system shown in FIG. 1 will now be discussed in detail.

Figure 2:
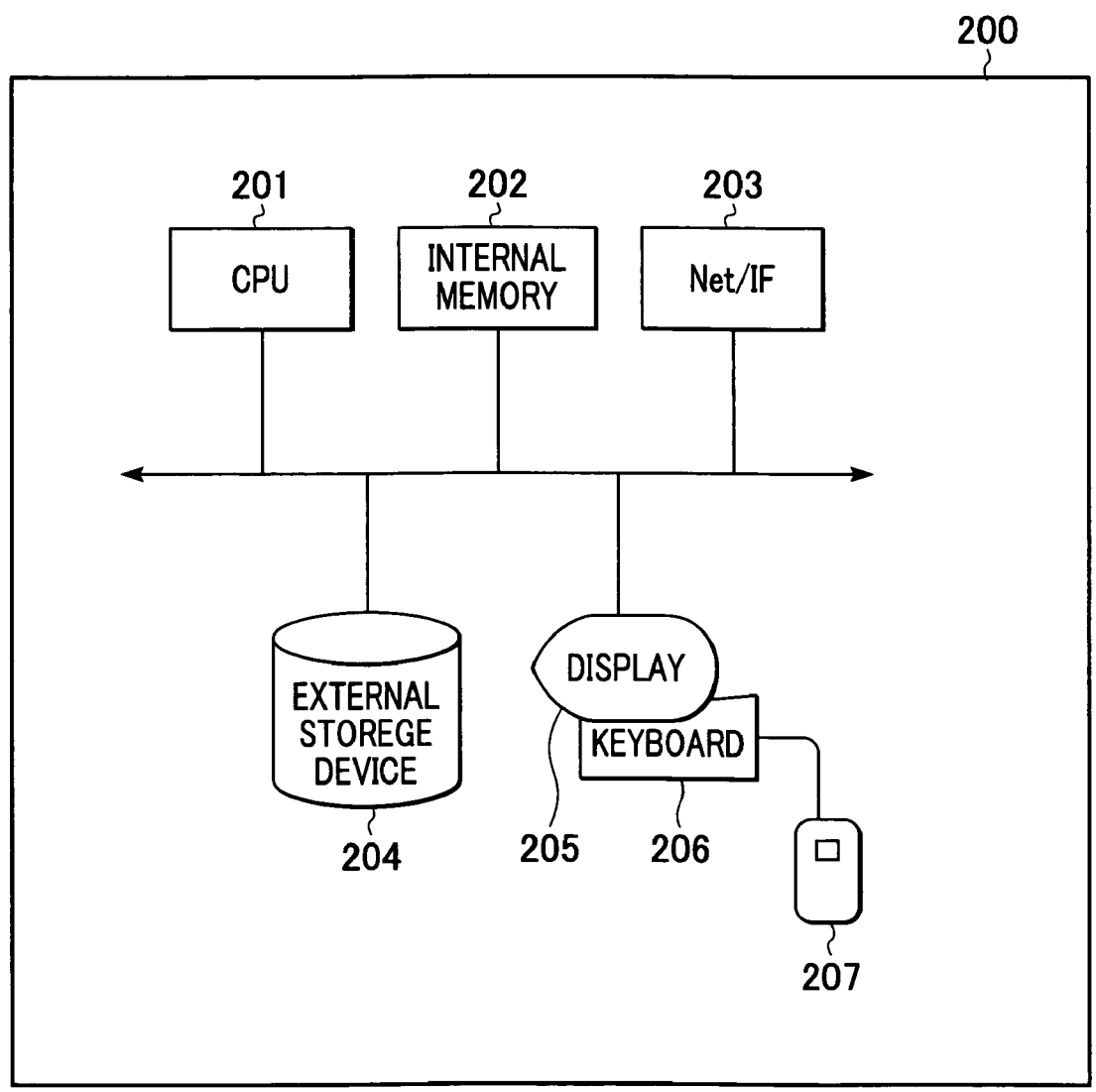
FIG. 2 illustrates the structure of a computer in the on-line sales system.

FIG. 2 is a block diagram illustrating one example of the computer 200 forming each of the support server 101, the orderer terminal 103, and the creator terminal 104.

A central processing unit (CPU) 201 generally controls the entire computer 200 under the control of a control program. An internal memory 202 stores the control program executed by the CPU 201, and copyrighted data such as document data or image data, and includes a random-access memory (RAM) and a read-only memory (ROM). A network interface 203, connected to the Internet 102, transmits and receives a variety of pieces of data. An external storage device 204 stores various data and files, and typically includes a magnetic disk. Also included in the computer 200 are a display 205, a keyboard 206, and a pointing device 207 such as a mouse. The CPU 201 executes a program stored in the internal memory 202, using the function of an operating system (OS) also stored in the internal memory 202, to write data to and read data from the internal memory 202, to write data to or read data from a file in the external storage device 204, to exchange data through the network interface 203, to receive information and commands input from one of the keyboard 206 and the pointing device 207, and to display various information and data on the display 205.

The CPU 201 executes the program by reading the program from the external storage device 204 or by receiving the program through the network interface 203.

The computer 200 may include a sound input unit (now shown) such as a microphone and an image input unit (now shown) such as a scanner.

The computer 200 may not necessarily include all elements described above. For example, the support server 101 may dispense with the display 205, or may share the keyboard 206 and the pointing device 207 with another computer 200.

FIG. 3 is a block diagram illustrating the software module structure of the support server 101 in accordance with the first preferred embodiment. The support server 101 is identified by a domain name "www.server.jp" over the Internet 102.

Upon receiving a command from a database program 308, the CPU 201 in the support server 101 logically constructs a set of tables in a file in the external storage device 204. An output medium database 301 stores a table for information concerning an output medium, a creator database 302 stores a table for information concerning a creator, a commercial item database 303 stores a table for information concerning a commercial item that is produced by outputting copyrighted data of the creator to the output medium, and an order database 304 stores a table for information concerning an order for a commercial item from an orderer. The structure of the tables stored in the databases 301-304 will be described later with reference to FIGS. 9 and 11 through 13.

In response to a command from any program stored in the internal memory 202, the CPU 201 in the support server 101 can gain access to a record in each table. The term access here is preferably intended to mean a process for adding a record to a table, a process for deleting a record from a table, a process for searching for a record in a table, or a process for acquiring a value set in a record in a table. This list should not be seen to cover all of the processes that can be performed by the present invention.

A copyrighted database 307 is the one the CPU 201 in the support server 101 constructs in the external storage device 204 in response to a command from the OS. The copyrighted database 307 stores the copyrighted data such as illustrations, photographs, and music, etc. The copyrighted data is uniquely identified by a file pathname. The CPU 201 in the support server 101 writes or reads copyrighted data in response to a command from any program stored in the internal memory 202.

A Web server program 305 is stored in the internal memory 202. Upon receiving a command from the Web server program 305, the CPU 201 in the support server 101 receives a hyper text transfer protocol (HTTP) request from an external terminal, such as the orderer terminal 103 or the creator terminal 104, via the Internet 102, and then the network interface 203. In response to a command from the web server program 305, the CPU 201 in the support server 101 sends an HTTP response to the orderer terminal 103 or the creator terminal 104 via the Internet 102 and the network interface 203. The body of the HTTP response is hyper text markup language (HTML) data.

A common gateway interface (CGI) program 306 is stored in the internal memory 202. Each CGI program 306 is identified by a respective CGI program name, and complies with the CGI interface standard. Upon receiving a command from the CGI program 306, the CPU 201 in the support server 101 receives an argument of an HTTP request, and outputs the body of an HTTP response.

The CGI program 306 is a native program having an execution format compatible with the OS. Alternatively, the CGI program 306 may be a script that is written in a script language such as servlet Java® Server Pages (JSP) operating on a Java®2 Enterprise Edition (J2EE) server, Active Server Pages (ASP) operating on an Internet Information Server (IIS), or Perl.

The HTTP request format includes a uniform resource locator (URL) and an argument attached thereto. The HTTP request is sent from the network interface 203 of one of the orderer terminal 103 and the creator terminal 104 to the support server 101 via the Internet 102.

The URL is divided into three major parts: a protocol part, an address part, and a pathname part. For example, if a URL is "http://www.server.jp/cgi/cbs", the protocol part is "http://", the address part is "www.server.jp", and the pathname part is "/cgi/cbs". The argument attached to the URL is a pair of parts "argument name=value" separated by a "&" symbol. For example, "id=30&pass=XXX". A first argument name is "id", and the value thereof is "30". A second argument name is "pass", and the value thereof is "XXX". The method for designating an argument is different depending on whether the method of the HTTP request is "GET" or "POST". In the case of "GET", "?" subsequent to the pathname of the URL is followed by the argument. In the case of "POST", the argument is designated in the body of the HTTP request. To designate the content of an image file other than a character string with an argument, the method is "POST", the body of the HTTP is set to be in a multi-purpose Internet mail extension (MIME) multi-part format, a file name, a file format, and an encode format are designated in each part of a header, and the content of a file is encoded and described in the body of each part, as regulated by the Request For Comment (RFC) 1867.

The HTTP requests are divided mainly into a static request and a dynamic request. In response to the static request, the CPU 201 in the support server 101 receives a command from the web server program 305, and operates to send the content of a file in the external storage device 204 directly as HTML data. In response to a command from the web server program 305, the CPU 201 in the support server 101 determines the content of what file to send in accordance with the pathname part of the URL. In the case of the dynamic request, the CPU 201 in the support server 101 receives a command from the web server program 305, inputs an argument of the HTTP request to the CGI program 306 through the CGI interface, and sends the output of the CGI program 306 as HTML data. In response to a command from the web server program 305, the CPU 201 in the support server 101 also inputs elements, including information relating to cookies and the HTTP request itself, other than the argument of the HTTP request to the CGI program 306 in accordance with environmental variables. By referencing the pathname of the URL, the CPU 201 in the support server 101, in response to a command from the web server program 305, determines whether the HTTP request is static or dynamic. If the pathname begins with "/cgi/", the CPU 201 determines the HTTP request as being dynamic, thereby recognizing a portion of the pathname part following "/cgi/" as a CGI program name. If the URL is "http://www.server.jp/cgi/cbs", the CGI program name is "cbs".

In response to a command from the CGI program 306, the CPU 201 in the support server 101 sends the HTTP request to the orderer terminal 103 or the creator terminal 104 through the network interface 203 and the Internet 102. Upon receiving a command from the CGI program 306, the CPU 201 in the support server 101 receives the HTML data as the body of the HTML response, or the copyrighted data from the orderer terminal 103, or the creator terminal 104.

FIG. 4 is a table listing the types of the CGI program 306, mapping to the URLs, and program names in the support server 101. Available here as major CGIs are a CGI for creator registration, a CGI for commercial item registration, a CGI for ordering, and a CGI for thumbnail image acquisition.

CGIs 401 and 402 are used to register creators. The URLs of the CGIs 401 and 402 are respectively "http://www.server.jp/cgi/welcome1" and "http://www.server.jp/cgi/welcome2". The program names of the CGIs 401 and 402 are respectively "welcome1" and "welcome2". CGIs 403-405 are used to register commercial items, and the URLs of the CGIs 403-405 are respectively "http://www.server.jp/cgi/creator1", "http://www.server.jp/cgi/creator2", and "http://www.server.jp/cgi/creator3". The program names of the CGIs 403-405 are respectively "creator1", "creator2", and "creator3".

CGIs 406, 407 and 408 are used for ordering by an orderer. The URLs of the CGIs 406, 407, and 408 are respectively "http://www.server.jp/cgi/view", "http://www.server.jp/cgi/order1", and "http://www.server.jp/cgi/order2". The program names of the CGIs 406, 407, and 408 are respectively "view", "order1", and "order2".

CGI 409 is used to acquire a thumbnail image. The URL of the CGI 409 is "http://www.server.jp/cgi/getThumb", and the program name of the CGI 409 is "getThumb". The operation the CPU 201 in the support server 101 performed in response to commands from each CGI program will be discussed in detail later with reference to FIGS. 14, 19, and 20.

FIG. 5 is a table listing the type of a file the CPU 201 in the support server 101 stores in the copyrighted database 307 in response to a command from the CGI program 306, a generation rule of the pathname of the file, and a calling method of the CGI 409 (FIG. 4) commanding the acquisition of thumbnail copyrighted data.

Reference 501 is a generation rule of a file pathname identifying the copyrighted data stored in the copyrighted database 307. As listed, the file pathname is generated with "var/image/" followed by a creator ID as a third layer, a commercial item ID as a fourth layer, and a file name as a fifth layer. As will be discussed later, the file name of the copyrighted data is designated by the creator. The creator ID is unique in the entire system, and the commercial ID is unique in each creator. Any file name can be designated, since that file name becomes unique and free from duplication in the sales system.

Reference 502 is a generation rule of the file pathname identifying thumbnail copyrighted data of the copyrighted data stored in the copyrighted database 307. As listed, the file pathname is generated with "var/thumbs/" followed by a creator ID as a third layer, a commercial item ID as a fourth layer, and a file name of a thumbnail image as a fifth layer. The file name of the thumbnail copyrighted data is designated by the creator. For the same reason as in the generation rule 501, any file name can be designated since that file name will be uniquely determined and free from duplication in the sales system.

A URL 503 is used to call a CGI that issues, to the CPU 201 in the support server 101, a command for acquiring the thumbnail copyrighted data. As listed, the creator ID is designated by an argument "cid=", and the commercial item ID is designated by an argument "pid=" to the URL of the CGI 409 for thumbnail copyrighted data acquisition. Upon receiving a command from the thumbnail acquisition CGI 409, the CPU 201 in the support server 101 generates the file pathname of the thumbnail copyrighted data in accordance with the creator ID and the commercial item ID designated by the arguments, reads the thumbnail copyrighted data designated by the generated file pathname from the copyrighted database 307, and outputs the content of the thumbnail copyrighted data file.

Figure 6:
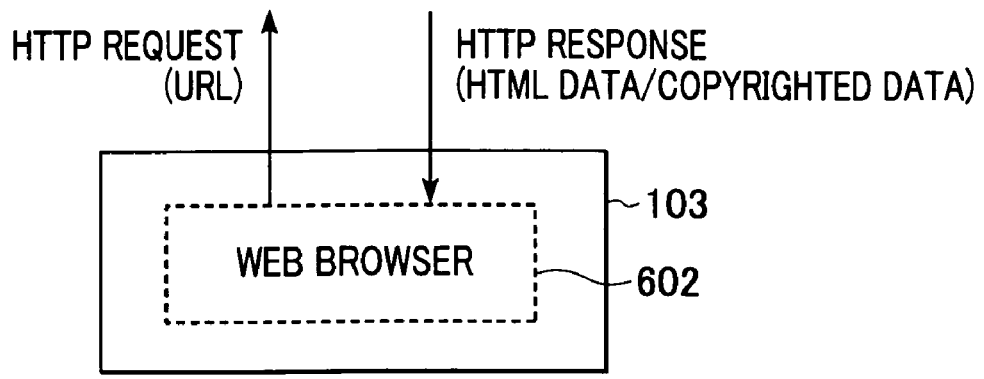
FIG. 6 illustrates a module structure of an orderer terminal.

FIG. 6 is a block diagram illustrating the module structure of the orderer terminal 103 in accordance with the first preferred embodiment of the present invention.

A web browser 602 is stored in the internal memory 202. When a URL of information desired to view is input to the web browser 602 from the keyboard 206 or the pointing device 207, the CPU 201 in the orderer terminal 103 receives a command from the web browser 602. The CPU 201 in the orderer terminal 103 sends an HTTP request containing the input URL to the support server 101 or the creator terminal 104 through the network interface 203 and via the Internet 102. Upon receiving a command from the web browser 602, the CPU 201 in the orderer terminal 103 receives an HTTP response responsive to the HTTP request from the support server 101 or the creator terminal 104 via the Internet 102 and through the network interface 203 in synchronization with the transmission of the HTTP request. In response to a command from the web browser 602, the CPU 201 in the support server 101 renders HTML data as the body of the HTTP response or the copyrighted data on the display 205.

Upon receiving a command from the web browser 602, the CPU 201 in the orderer terminal 103 parses the HTML data for lexical analysis and syntax analysis in accordance with the rules regulated in the World Wide Web Consortium (W3C) if the HTTP response is the HTML data. If the HTTP response is image data, the image data is parsed in accordance with an image data format.

Figure 7:
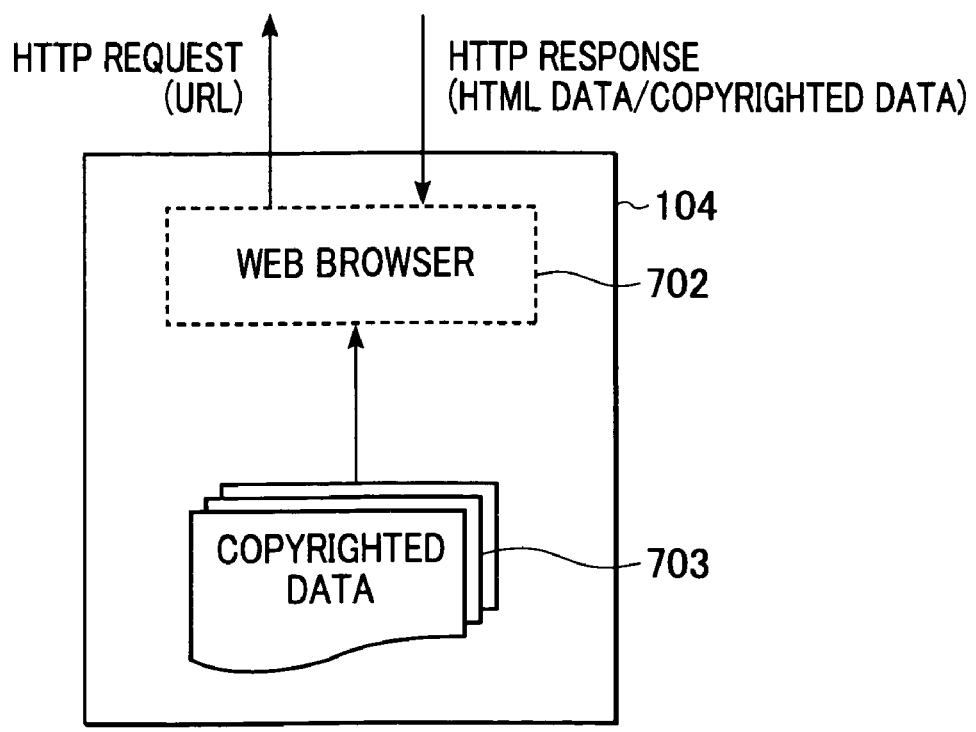
FIG. 7 illustrates the module structure of a creator terminal.

FIG. 7 is a block diagram illustrating the module structure of the creator terminal 104 of the first preferred embodiment of the present invention. A web browser program 702 is a program similar to web browser 602.

Copyrighted data 703 is stored in the external storage device 204 in the creator terminal 104. The copyrighted data 703 is uniquely identified by a "file pathname" in the external storage device 204. In response to a command from the web browser program 702, the CPU 201 in the creator terminal 104 receives HTML data. If the HTML data contains a form and the form contains a "file selection" control, the CPU 201 in the creator terminal 104 sends the content of the designated copyrighted data 703 as part of the argument of the HTTP request. The HTTP request is sent in response to a command from the web browser program 702 when the keyboard 206 or the pointing device 207 in the creator terminal 104 designates a file pathname of the copyrighted data 703 to the "file selection" control and inputs a transmission command to the form. The HTTP request takes the above-mentioned MIME multipart format.

FIG. 8 is a table illustrating the file pathnames and the content of the files of the copyrighted data 703 in the creator terminal 104. Listed in the table as major data are copyrighted data and thumbnail copyrighted data, where 801 and 802 are copyrighted data and 803 and 804 are thumbnail copyrighted data.

The copyrighted data 801 is identified by a file pathname "c:/images/image1.jpg". If the copyrighted data is image data, the content of the image data has a size with a height dimension of 1200 pixels and a width dimension of 800 pixels. Similarly, the copyrighted data 802 is identified by a file pathname "c:/images/image2.jpg", and the content of the image data has a size with a height dimension of 800 pixels and a width dimension of 600 pixels. The thumbnail copyrighted data 803 and 804, correspond to the copyrighted data 801 and 802 respectively, and have file pathnames "c:/thumbs/thumb1.jpg" and "c:/thumbs/thumb2.jpg", respectively. Since the thumbnail copyrighted data 803 is thumbnail image data of the image data 801, the thumbnail copyrighted data 803 has the same aspect ratio of the image data 801. The thumbnail copyrighted data 803 has a size of a height dimension of 60 pixels and a width dimension of 40 pixels. Since the thumbnail copyrighted data 804 is thumbnail image data of the copyrighted data 802, the thumbnail copyrighted data 804 has the same aspect ratio of the image data 802. The thumbnail copyrighted data 804 has a size of a height dimension of 60 pixels and a width dimension of 45 pixels.

The structure of a record stored in the databases 301-304 used in the first preferred embodiment of the present invention will now be described in detail with reference to FIGS. 9-13.

FIG. 9 illustrates the structure of the record of the output medium database 301 in which an operator entity stores information relating to an output medium to be output.

An output medium code 901 uniquely identifies an output medium. The output medium code 901 is designated as a primary key (PK) so that none of the output medium codes 901 duplicate each other in records in the output medium database 301.

An output medium name 902 is a character string for identifying the output medium. For example, the output medium name 902 may be a sheet of paper having an A4 sheet size, prophoto paper of size L, a card, a mug cup, CD-R, or the like.

Cost (minimum selling price) 903 is the cost required to output the copyrighted data to the output medium. The unit of cost here is US dollars.

Resolutions 904 and 905, required by the creator or an output operator entity, are permissible resolutions of the image data printed on the output medium in a vertical height and a horizontal width when the copyrighted data is image data. The unit of resolutions here is a pixel.

The name of unit of orders, 906, and the name of unit of commercial items, 907, and the number of commercial items per purchase order, 908, are also listed.

For example, if the creator and the output operator entity desire to sell mugs one-by-one, post cards by sets of five sheets, and want to refer to a mug as one set as the unit of orders, and five sheets of post cards as one set as the unit of orders. Listed in this case are "mug" in the output medium name 902, "set" in the name of unit of orders 906, "unit" in the name of unit of commercial items 907, and "1" in the number of commercial items per purchase order 908. Also listed is "post card" in the output medium name 902, "set" in the name of unit of orders 906, "sheet" in the name of unit of commercial items 907, and "5" in the number of commercial items per purchase order 908.

FIG. 10 illustrates the content of records registered in the output medium database 301.

An output medium record 1001 holds "TS-W-S" in the output medium code 901, "T-shirt (white) small size" in the output medium name 902, "30" in the cost (minimum selling price) 903, "set" in the name of unit of orders 906, "unit" in the name of unit of commercial items 907, and "1" in the number of commercial items per purchase order 908. The unit of orders is "1 set=1 unit". When the copyrighted data is image data, "1200" is stored in the permissible resolution (height) 904, and "800" is stored in the permissible resolution (width) 905.

Like the output medium record 1001, the output medium records 1002-1008 hold data of respective commercial items.

FIG. 11 illustrates the structure of a record of the creator database 302. The creator database 302 stores information relating to a creator who produces or holds the copyrighted data output to the output medium, and sells the commercial item that is the output medium with the copyrighted data output thereto.

A creator ID 1101 is a code for uniquely identifying the creator. The creator ID 1101 is designated as a PK so that none of the creator IDs 1011 duplicates each other among records in the creator database 302.

Also listed in FIG. 11 are a password 1102, a creator name 1103, a postal code 1104 of a creator, an address 1105 of the creator, a telephone number 1106 of the creator, and a mail address 1107 of the creator. In addition, payment destination bank 1108, a payment destination bank depot 1109, a type of account 1110 at the payment destination bank, an account number 1111 at the payment destination bank, and a name of account holder 1112 at the payment destination bank are also included in creator database 302.

The registration of the creator record to 1101-1112 will be discussed with reference to FIG. 14 later.

FIG. 12 illustrates the structure of a record in the commercial item database 303 storing information relating to a commercial item sold by the creator.

A creator ID 1201 is an identification of a creator who has registered a commercial item. Since the creator ID 1201 is stored by referencing the creator ID 1101 in the creator database 302, the creator ID 1201 is designated as a foreign key (FK).

The creator ID 1201 holds a code uniquely identifying the creator who registers the commercial item. A combination of the creator ID 1201 and a commercial item ID 1202 is designated as a PK so that none of the commercial items IDs 1202 is duplicated to the same creator among the records in the commercial item database 303.

Fields 1203-1206 store information relating to the commercial items and the information is stored during the commercial item registration to be discussed later with reference to FIG. 19.

Since the field 1203 is filled by referencing the output medium code 901 of the output medium database 301, the field 1203 is designated as an FK. The field 1204 stores a URL for accessing the copyrighted data. The field 1205 stores a URL for accessing the thumbnail copyrighted data of the copyrighted data. The field 1206 stores a selling price of the commercial item.

FIG. 13 illustrates the structure of a record in the order database 304 that stores the content of an order for a commercial item.

An order ID 1301 is a code for uniquely identifying the order. The order ID 1301 is designated as a PK so that none of the orders IDs 1301 is duplicated in among records in the order database 304.

Since a creator ID 1302 of the commercial item ordered is stored by referencing the creator ID 1101 of the creator database 302, the creator ID 1302 is designated as an FK.

Fields 1303-1305 hold information the orderer designates during the ordering of the commercial item to be discussed later with reference to FIG. 25. A field 1303 holds a delivery destination address of the commercial item, a field 1304 holds a name of an addressee, and a field 1305 holds a telephone number of the addressee of the commercial item.

Fields 1306 and 1307 hold information relating to the commercial item ordered by the orderer. The field 1306 holds the commercial item ID of the commercial item. Since the commercial item ID 1306 is stored by referencing the commercial item ID 1202 in the commercial item database 303, the commercial ID 1306 is designated as an FK. The field 1307 holds the number of ordered units of the commercial items.

Any number of fields may be used for the commercial items ID 1306 and the numbers of ordered units 1307. FIG. 13 lists up to 1306-n and 1307-n as n-th fields.

A sum of purchase of commercial items ordered is held in a field 1310. The selling price 1206 is acquired by referencing the records of the commercial item database 303 using commercial item IDs 1306-1 through 1306-n as keys. The numbers of ordered units 1307-1 through 1307-n are multiplied by the respective selling prices 1206, and the resulting products are summed. The sum is then stored in the sum of purchase field 1310.

A consumption tax is stored in a field 1311. The consumption tax is calculated by multiplying the sum of purchase in the field 1310 by a consumption tax rate (i.e., 5% in the first preferred embodiment).

The sum of the sum of purchase 1310 and the consumption tax amount 1311 is billed to the orderer in connection with the commercial items ordered.

A sum of costs is stored in a field 1312. An output medium code 1203 is acquired by referencing the commercial item database 303 using the commercial item IDs 1306-1 through 1306-n as keys. The cost (i.e., minimum selling price) 903 is acquired by referencing the output medium database 301 using the output medium code 1203 as a key. The numbers of ordered units 1307-1 through 1307-$n$ are multiplied by the respective costs (i.e., minimum selling prices) 903, and the resulting products are summed as the sum of costs in a field 1312.

An order flag 1313 for indicating whether the order is completed has an "OFF" or an "ON" state. The order flag remains "OFF" until the orderer verifies a firm order using the keyboard 206 or the pointing device 207. Upon verification of a firm order by the orderer, the CPU 201 in the support server 101 sets the order flag 1313 to "ON".

An on-line registration to the support server 101 will now be described in detail with reference to FIGS. 14 through 18. The creator performs the on-line registration on the creator terminal 104 via operation of the keyboard 206 and/or the pointing device 207.

FIG. 14 illustrates a sequence of the creator registration process executed by the support server 101 and the creator terminal 104.

In step S1401, the CPU 201 in the creator terminal 104 starts up the web browser program 702 in response to an input from the keyboard 206 and/or the pointing device 207 when the creator operates the keyboard 206 and/or the pointing device 207. The CPU 201 in the creator terminal 104 inputs a URL for displaying a creator registration screen "http://www.server.jp/cgi/welcome1" (see the CGI 401 in FIG. 4). In response to a command from the web browser program 702, the CPU 201 in the creator terminal 104 sends an HTTP request, containing the URL, via the Internet 102 to the support server 101 for displaying the creator registration screen.

In response to a command from the web server program 305, the CPU 201 in the support server 101 receives the HTTP request, and associates the URL for displaying the creator registration screen with the CGI program 306 "welcome1" on a one-to-one basis (see the CGI 401 in FIG. 4).

In step S1402, in response to a command from the web server program 305, the CPU 201 in the support server 101 inputs an argument of the HTTP request to the CGI program 306 "welcome1", and the CGI program 306 "welcome1" outputs HTML data representing the creator registration screen. Here, the argument is empty. In response to a command from the Web server program 305, the CPU 201 in the support server 101 sends an HTTP response having, as the body thereof, the HTTL data for the displaying the creator registration screen to the creator terminal 104 via the Internet 102.

In response to a command from the web browser program 702, the CPU 201 in the creator terminal 104 receives the HTTP response, and renders on the display 205, the HTML data for displaying the creator registration screen, namely, the body of the HTTP response.

FIG. 15 illustrates the rendered HTML data. A creator registration screen 1500 is constructed using an HTML form function. The use of a form allows a destination URL of the HTTP request and the argument thereof to be designated. Designated here as a URL is a creator registration content input URL "http://www.sever.jp/cgi/welcome2" (see the CGI 402 in FIG. 4). Fields 1501-1512 are used to input or select information relating to the creator, namely, designate the argument of the HTTP request. Shown here are the field 1501 for a creator ID, the field 1502 for a password that is used when the creator logs in the support server 101, the field 1503 for the name of the creator, the field 1504 for a postal code of the creator, the field 1505 for an address of the creator, the field 1506 for a telephone number of the creator, the field 1507 for an electronic mail address of the creator, the field 1508 for a payment destination bank of the creator, the field 1509 for a payment destination bank depot of the creator, the field 1510 for a type of account at the payment destination bank of the creator, the field 1511 for an account number of at the payment destination bank of the creator, and the field 1512 for the name of the holder of the account of the creator at the payment destination bank. The field 1510 for the type of account at the payment destination bank is a selection field, and the remaining fields are input fields.

Returning to FIG. 14, in step S1403, the creator inputs data, at the creator terminal 104, in the selection and input fields 1501-1512 on the creator registration screen 1500 displayed by the web browser program 702. The data is inputted using the keyboard 206 and/or the pointing device 207.

FIG. 16 shows the creator registration screen 1500 displayed on the creator terminal 104 with data input therein. The password input field 1602 shows "***", even though "XXX" is inputted. In order to preserve the secrecy of the password, the actual contents of this field (i.e., "XXX") are not displayed on the display 205. The transmitted argument of the HTTP request corresponding to the input field 1602 is "XXX" rather than "***".

The CPU 201 in the creator terminal 104 receives a command from the web browser program 702 when the creator presses an "OK" button 1613 using the keyboard 206 or the pointing device 207. The CPU 201 in the creator terminal 104 sends the creator registration content input URL "http://www.server.jp/cgi/welcome2" (see the CGI 402 in FIG. 4) and the HTTP request containing the content of the fields 1601-1612 as the argument to the support server 101 via the Internet 102.

Upon receiving a command from the web server program 305, the CPU 201 in the support server 101 receives the HTTP request, and associates the creator registration content input URL with the CGI program 306 "welcome2" on a one-to-one basis (see the CGI 402 in FIG. 4).

Returning to FIG. 14, in step S1404, the CPU 201 in the support server 101 receives the argument of the HTTP request to the CGI program 306 "welcome" in response to a command from the web server program 305. As previously discussed, the argument is the content input or selected in the fields 1601-1612 as shown in FIG. 16. In response to a command from the CGI program 306 "welcome2", the CPU 201 in the support server 101 checks the argument prior to initiating a creator registration process.

The CPU 201 in the support server 101 checks to see if a creator ID field 1601 is empty. If it is determined that the creator ID field 1601 is empty, the CPU 201 in the support server 101 determines that the content of registration is in error, and proceeds to step S1405.

If the creator ID field 1601 is not empty, the CPU 201 in the support server 101 receives a command from the database program 308, and searches for a record in the creator database 302 using the creator ID in the field 1601 as a key. Since the creator ID 1101 in the creator database 302 is a PK as shown in FIG. 11, none of the creator IDs is duplicated across a plurality of records. If a corresponding record is found in the search, the CPU 201 in the support server 101 determines that the content of registration is in error, and proceeds to step S1405. If no corresponding record is found in the search, the CPU 201 in the support server 101 proceeds to step S1406.

Additional checks may be performed in step S1404. For example, the CPU 201 in the support server 101 may check to see if the postal code in the field 1604 and the address in a field 1605 are authentic. Furthermore, the CPU 201 in the support server 101 may check the number of digits of the telephone number in the field 1606, whether the telephone number is a long-distance call number or a local call number, the format of and accessibility to the mail address in the field 1607, if the payment destination bank in the field 1608 is authentic, and the number of digits of the account number at the payment destination bank in the field 1611.

In step S1405, the CPU 201 in the support server 101 receives a command from the CGI program 306 "welcome2"

and outputs HTML data for displaying an error screen if the checking of the argument of the HTTP request in step S1404 determines that the argument is in error.

In response to a command from the web server program 305, the CPU 201 in the support server 101 sends an HTTP response having error screen displaying HTML data as the body thereof to the creator terminal 104 via the Internet 102.

In response to a command from the web browser program 702, the CPU 201 in the creator terminal 104 receives the HTTP response, and renders the error screen displaying HTML data as the body of the HTTP response on the display 205.

The rendered HTML data is shown in FIG. 16. As shown, a message indicating the content of an error is added to the creator registration content input screen.

In step S1406, the CPU 201 in the support server 101 receives a command from the CGI program 306 "welcome2", and registers creator information designated by the argument.

Upon receiving a command from the CGI program 306 "welcome2", and a command from the database program 308, the CPU 201 in the support server 101 adds a new record to the creator database 302. As already discussed, the creator database 302 has the record structure as shown in FIG. 11. An input value in the field 1601 is registered for the creator ID 1101, an input value in the field 1602 is registered for the password 1102, an input value in the field 1603 is registered for the creator name 1103, an input value in the field 1604 is registered for the postal code 1104, an input value in the field 1605 is registered for the address 1105, an input value in the field 1606 is registered for the telephone number 1106, an input value in the field 1607 is registered for the mail address 1107, an input value in the field 1608 is registered for the payment destination bank 1108, an input value in the field 1609 is registered for the payment destination bank depot 1109, a selected value in the field 1610 is registered for the type of account 1110, an input value in the field 1611 is registered for the account number at the payment destination bank 1111, and an input value in the field 1612 is registered for the name of the account holder 1112. FIG. 17 illustrates the content of the registered record.

In step S1407, the CPU 201 in the support server 101 receives a command from the CGI program 306 "welcome2" and outputs HTML data indicating a creator registration ending screen when the registration of the record to the creator database 302 is complete. Upon receiving a command from the web server program 305, the CPU 201 in the support server 101 sends an HTTP response having the HTML data for displaying the creator registration ending screen as the body thereof to the creator terminal 104 via the Internet 102.

In response to a command from the web browser program 702, the CPU 201 in the creator terminal 104 receives the HTTP response, and renders the HTTP response on the display 205.

Figure 18:
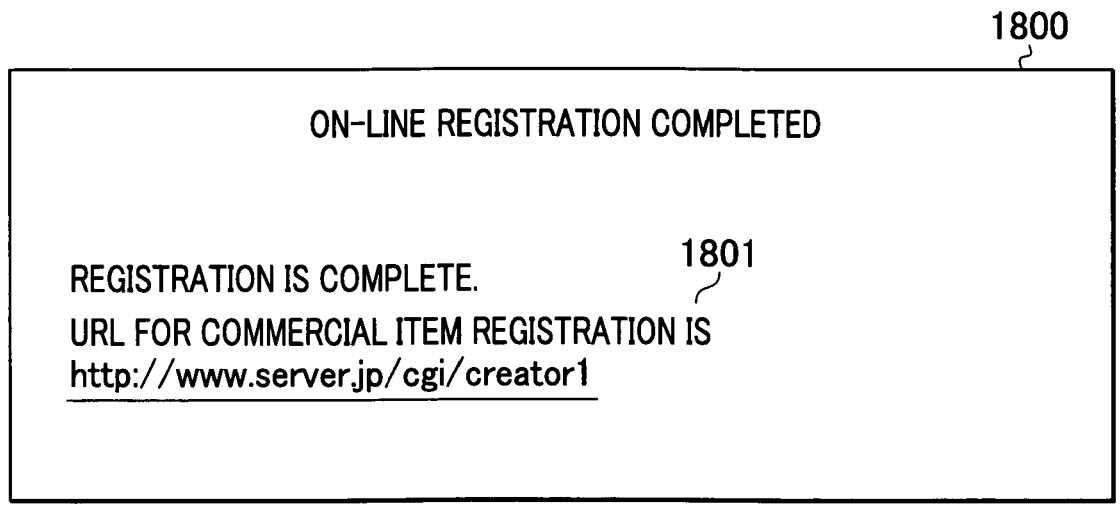
FIG. 18 illustrates a creator registration ending screen.

FIG. 18 shows the rendered HTTP response. The creator registration ending screen 1800 displays a URL 1801 to allow the creator to continuously register the commercial item in succession to the inputting of variety of information. The commercial item registration URL 1801 is a URL of the CGI the support server 101 prepares for the registration of a commercial item of the creator, and is identical to the URL shown at the CGI 403 in FIG. 4.

A registration process of a commercial item is described in detail with reference to FIGS. 19 through 24. The creator terminal 104 registered in the support server 101 performs the registration process to the support server 101 of the first preferred embodiment.

Figure 19:
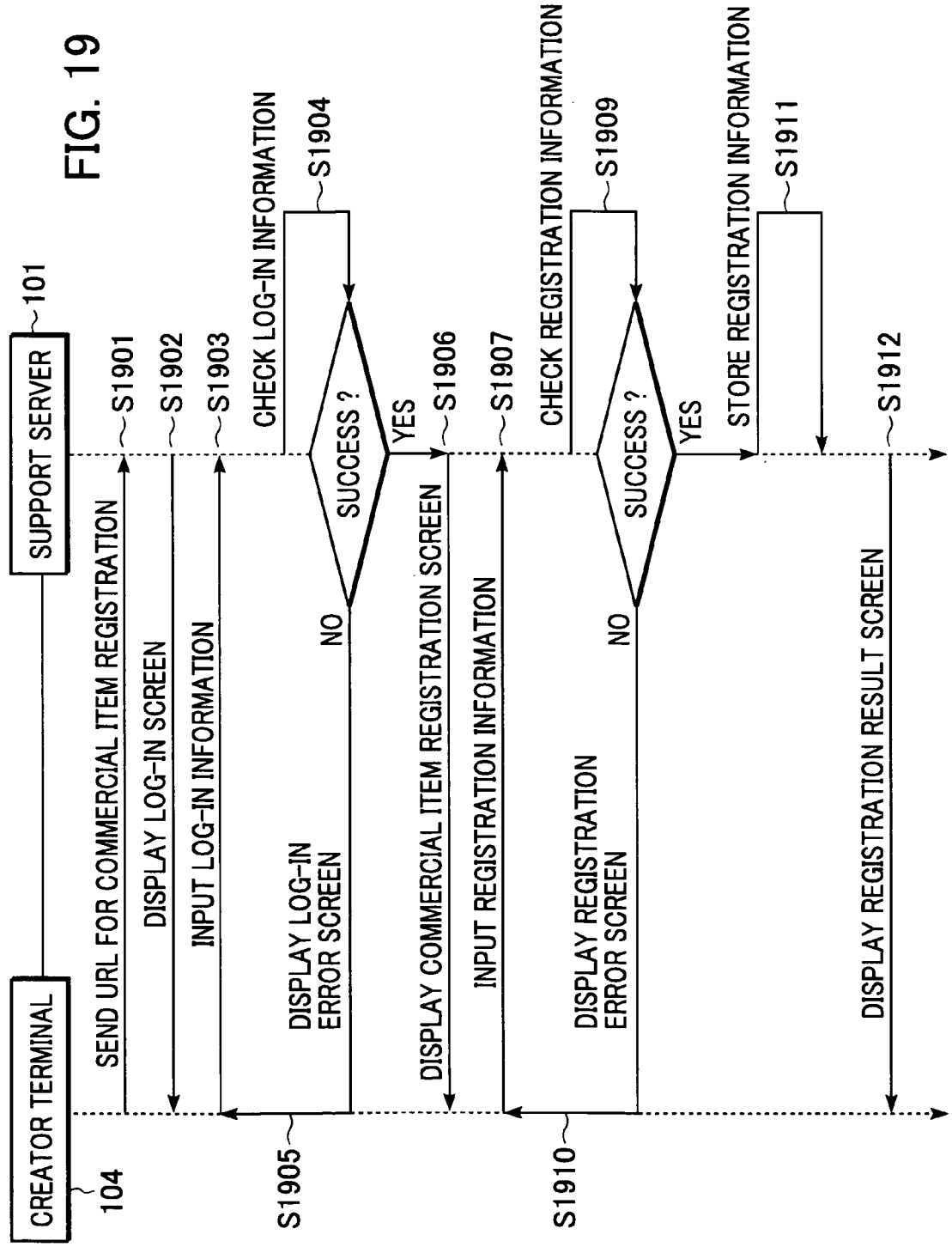
FIG. 19 illustrates a commercial item registration sequence.

FIG. 19 shows a sequence of the commercial item registration.

In step S1901, the creator terminal 104 initiates the web browser program 702 in response to a command the creator inputs using the keyboard 206 and/or the pointing device 207. A URL for commercial item registration "http://www.server.jp/cgi/creator" (see the CGI 403 in FIG. 4 and the URL 1801 in FIG. 18) is then entered. Upon receiving a command from the web browser program 702, the CPU 201 in the creator terminal 104 sends an HTTP request containing the commercial item registration URL to the support server 101 via the Internet 102.

Upon receiving a command from the web server program 305, the CPU 201 in the support server 101 receives the HTTP request, and associates the commercial item registration URL with the CGI program 306 "creator1" on a one-to-one basis (see the CGI 403 in FIG. 4).

In step S1902, in response to a command from the web server program 305, the CPU 201 in the support server 101 inputs the argument of the HTTP request to the CGI program 306 "creator1", and the CGI program 306 "creator1" outputs HTML data representing a creator log-in screen. The argument here is empty. In response to a command from the web server program 305, the CPU 201 in the support server 101 sends the HTTP response having the creator log-in screen displaying HTML data as the body thereof to the creator terminal 104 via the Internet 102.

In response to a command from the Web browser program 702, the CPU 201 in the creator terminal 104 receives the HTTP response, and renders the creator log-in screen displaying HTML data as the body of the HTTP response on the display 205.

Figure 20:
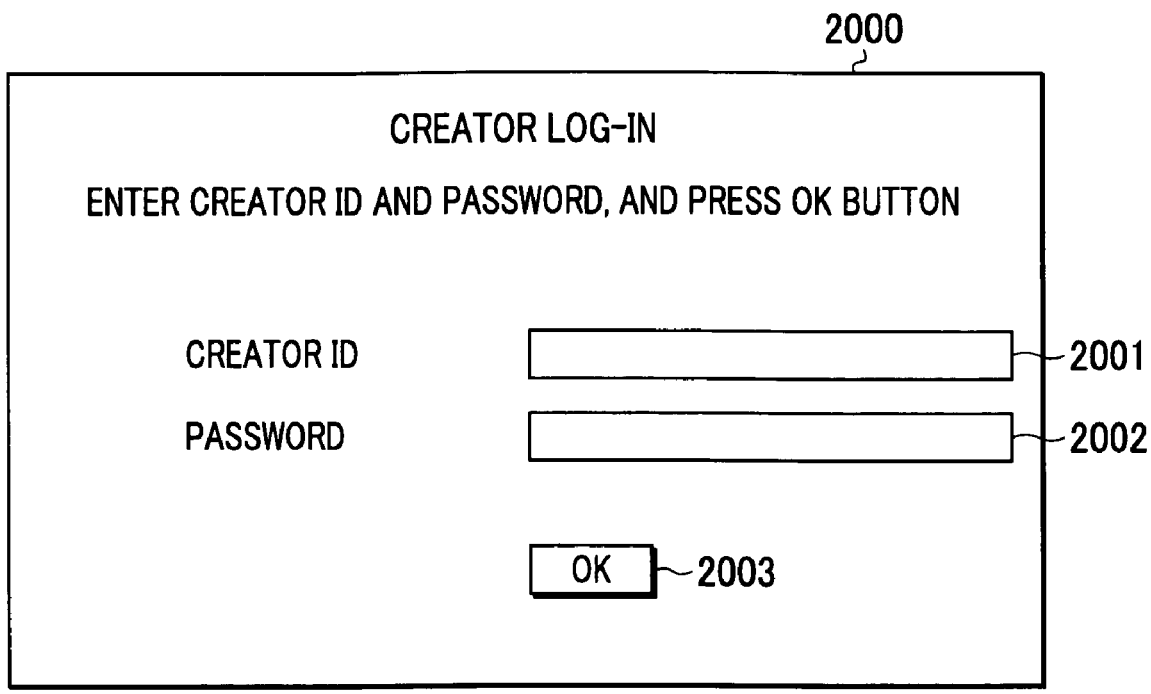
FIG. 20 illustrates a registered creator log-in screen.

FIG. 20 shows the rendered HTTP response. A creator registration log-in screen 2000 is constructed using the form function of the HTML. Designated as a destination URL of the HTTP request is a creator log-in processing URL "http://www.server.jp/cgi/creator2" (see the CGI 404 in FIG. 4). Input fields 2001 and 2002 are used to receive the argument of the HTTP request.

Returning to FIG. 19, in step S1903, the creator enters data via the creator registration log-in screen 2000 displayed on the creator terminal 104 by web browser program 702. The data is entered using the keyboard 206 and/or pointing device 207.

Figure 21:
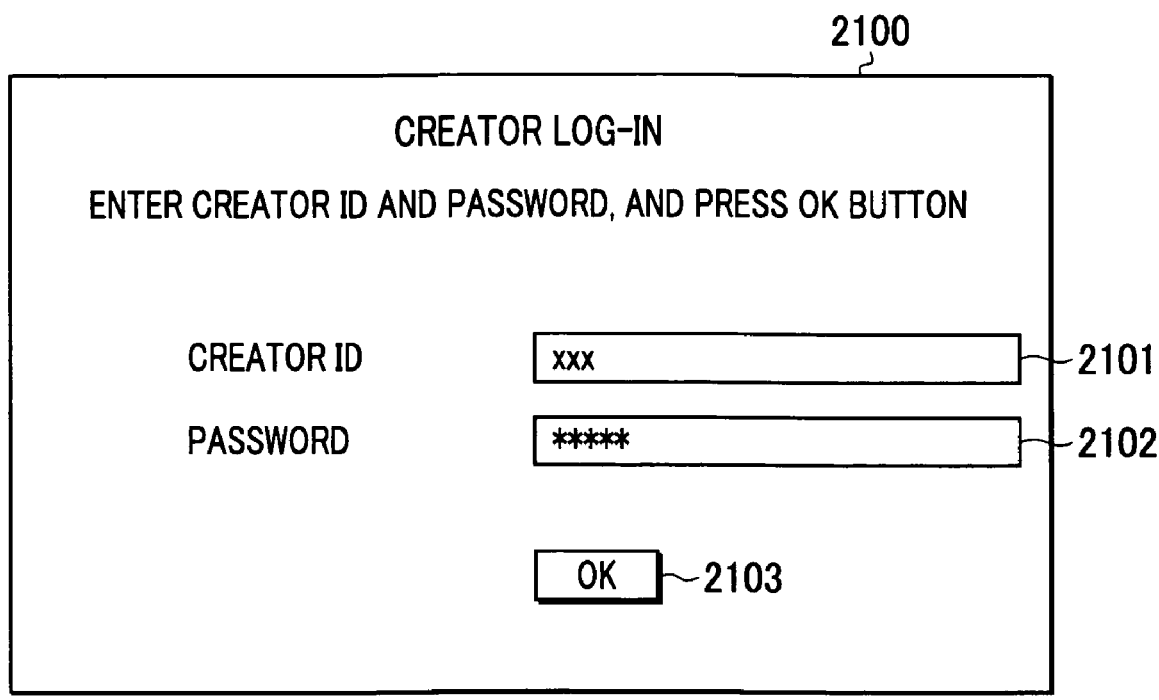
FIG. 21 illustrates an input-example of the registered creator log-in screen.

FIG. 21 shows the creator registration log-in screen 2000 with data input therein in the creator terminal 104. A password input field 2102 shows "***". In order to preserve secrecy of the password, "*" is displayed in password input field 2102 instead of the actual characters entered into the field 2102. The transmitted argument of the HTTP request corresponding to the input field 2102 is the actual characters entered into the field 2102, rather than "***".

The creator terminal 104 receives a command from the web browser program 702 when the creator presses an "OK" button 2103 using the keyboard 206 and/or the pointing device 207. The CPU 201 in the creator terminal 104 sends the creator log-in processing URL "http://www.server.jp/cgi/creator2" (see the CGI 404 in FIG. 4) and the HTTP request containing the character strings input in the fields 2101-2102 as the argument to the support server 101 via the Internet 102.

Upon receiving a command from the web server program 305, the support server 101 receives the HTTP request, and associates the creator log-in processing URL with the CGI program 306 "creator2" on a one-to-one basis (see the CGI 404 in FIG. 4).

Returning to FIG. 19, in step S1904, the CPU 201 in the support server 101 inputs the argument of the HTTP request to the CGI program 306 "creator2" in response to a command from the web server program 305. Here, "XXX" is input for the creator ID, and "XXX" is input for the password. In response to a command from the CGI program 306 "creator2", the CPU 201 in the support server 101 checks the argument. The CPU 201 in the support server 101 checks to see if at least one of the arguments of creator ID and password is empty. If one of the arguments is empty, the CPU 201 in the support server 101 determines that the arguments are in error, and proceeds to step S1905.

Upon receiving a command from the CGI program 306 "creator2", and a command from the database program 308, the CPU 201 in the support server 101 searches for a record in the creator database 302 using the creator ID in the argument as a key. If no corresponding record is found, the CPU 201 in the support server 101 determines that the argument is in error, and proceeds to step S1905.

In response to a command from the CGI program 306 "creator2", the CPU 201 in the support server 101 compares the password 1002 of the found record with the password of the argument. If both fail to match, the CPU 201 in the support server 101 determines that the record is in error, and proceeds to step S1905.

As shown in FIG. 11, the creator ID 1101 is a PK in the creator database 302, therefore, the corresponding records is only one at most. If the corresponding record is found and the passwords match each other, the check is determined as being successful.

In accordance with the first preferred embodiment, one record having the creator ID "XXX" and the password "XXX" is present as shown in FIG. 17. The CPU 201 in the support server 101 determines that the check is successful, and then proceeds to step S1906.

By receiving a command written in Java® Script, the CPU 201 in the support server 101 may check to see if either of the creator ID or the password is empty in the HTML data constituting the creator log-in screen shown in FIGS. 20 and 21. Since the CPU 201 in the creator terminal 104 checks whether a field is empty by receiving the command from the web browser program 702, communications in step S1903 and step S1905 can be skipped if the argument is empty. In such a case, however, to prevent the CGI program 306 from performing an erroneous operation arising from receiving a malicious HTTP request (i.e., altered argument), the CPU 201 in the creator terminal 104 typically checks in step S1904 to see if the argument is empty. This practice is also performed in other cases when the CGI program 306 checks whether the argument is empty.

Turning to step S1905, the CPU 201 in the support server 101 outputs HTML data representing an error screen in response to a command from the CGI program 306 "creator2". In response to a command from the web server program 305, the CPU 201 in the support server 101 sends an HTTP response having error screen displaying HTML data as the body thereof to the creator terminal 104 via the Internet 102.

In response to a command from the web browser program 702, the CPU 201 in the creator terminal 104 receives the HTTP response and renders the creator log-in screen displaying HTML as the body of the HTTP response on the display 205 of the creator terminal 104. In the rendered HTTP response, a message indicating the content of an error is added to the creator log-in screen shown in FIG. 21.

In step S1906, the CPU 201 in the support server 101 outputs HTML data representing a commercial item registration screen in response to a command from the CGI program 306 "creator2". In response to a command from the web server program 305, the CPU 201 in the support server 101 sends an HTTP response containing commercial item registration screen displaying HTML data to the creator terminal 104 via the Internet 102.

In response to a command from the web browser program 702, the CPU 201 in the creator terminal 104 receives the HTTP response, and renders the HTTP response on the display 205.

Upon receiving a command from the CGI program 306 "creator2", the CPU 201 in the support server 101 establishes a session with the creator terminal 104, and stores, as session data, the creator ID "XXX" of the creator who has successfully logged in.

Figure 22:
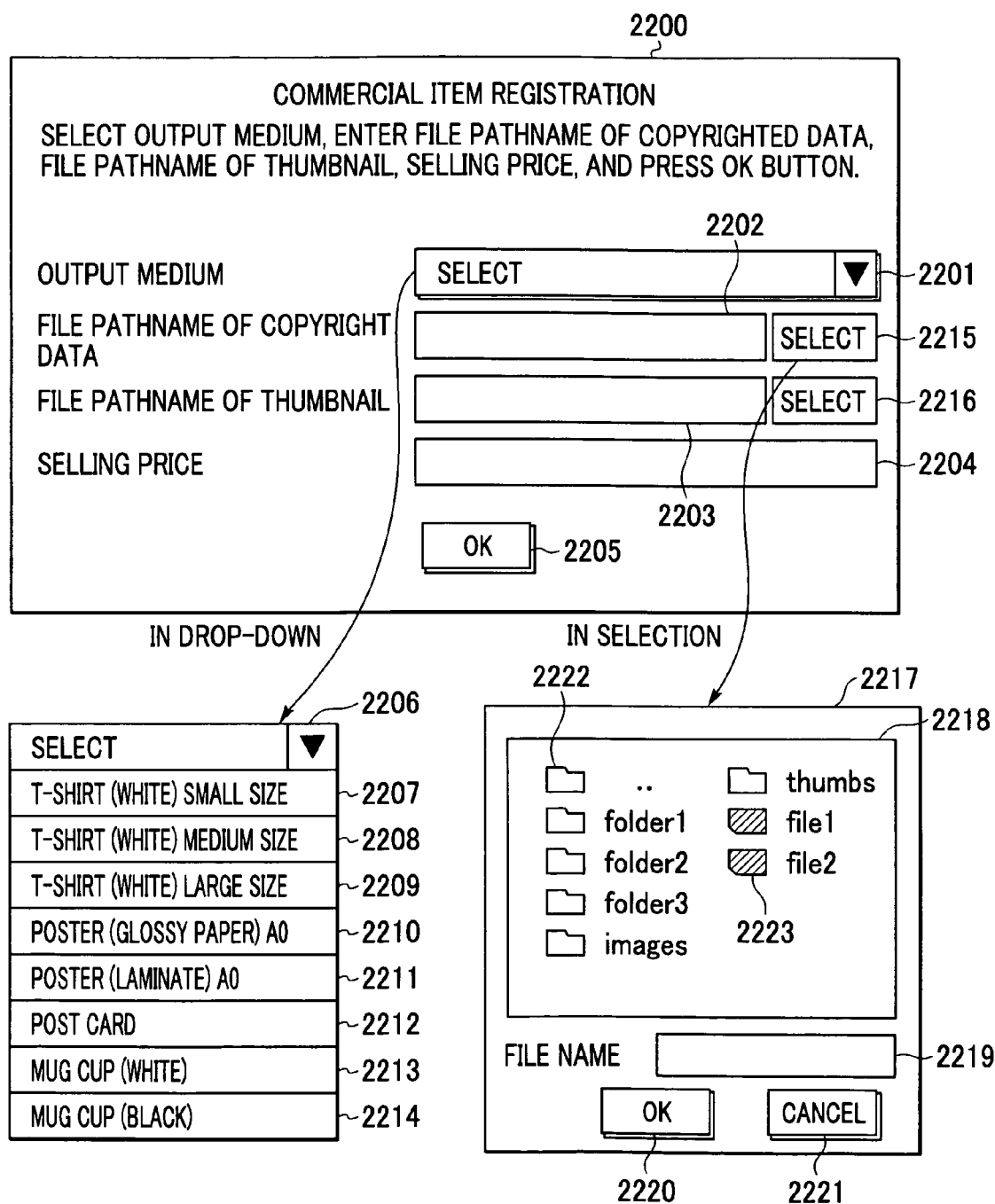
FIG. 22 illustrates a commercial item registration screen.

The session and the session data will now be described. Communication using HTTP is not persistent. An HTTP request (A) the creator terminal 104 sends to the support server 101 at one given time is not related to an HTTP (B) request the creator terminal 104 sends to the support server 101 at another given time. The session is a management mechanism of the support server 101 so that HTTP communication is virtually persistently performed between the creator terminal 104 and the support server 101. For example, the support server 101 recognizes that the HTTP request (A) is related to the HTTP request (B). The session is typically achieved using a cookie. To start a session on the support server 101, a unique session ID is generated and attached, as cookie, to an HTTP response to be sent to the creator terminal 104. Since the HTTP request sent from the creator terminal 104 to the support server 101 has the cookie attached thereto thereafter, the support server 101 can acquire the session ID from the received HTTP request using the cookie. If the session ID remains the same as the one previously issued, the support server 101 recognizes that the HTTP request at the issue of the session ID is related to the current HTTP (i.e., the HTTP requests are in the same session). The persistent HTTP communication is virtually established in this way. The duration of persistency of the session is, at the longest, the service life of the cookie. The session data is the data that is held in the internal memory 202, with the session ID used as a key. In a persistent HTTP communication virtually established, the CPU 201 in the support server 101 can write or read the web server program 305 or the CGI program 306 at any point of time within the duration of persistency. FIG. 22 shows the rendered HTTP response. The commercial item registration screen is constructed using the form function of the HTML. Designated as a destination URL of the HTTP request is the commercial item registration processing URL "http://www.server.jp/cgi/creator3" (see the CGI 405 in FIG. 4).

A field 2201 is used to select an output medium. When the creator drops down a menu 2206 using the keyboard 206 and/or the pointing device 207, one of the output media (see FIG. 10) registered in the output medium database 301 can be selected. When the CPU 201 in the creator terminal 104 outputs the HTML data in response to a command from the CGI program 306 "creator2", the CPU 201 in the creator terminal 104 accesses the output medium database 301 in response to a command from the database program 308, acquires a table of the registered output media (see FIG. 10), and generates a SELECT statement in the form function of the HTML using the table of the output media. The SELECT statement expresses selected items in a list of OPTION statements. The OPTION statement designates a character string sent as the argument of the HTTP request with a VALUE attribute, and designates a displayed character string to be rendered on the display 205 with a value. The output medium record 1001 in the output medium database 301 is used as the argument and the output medium name 1002 in the output medium database 301 is used as the display character string. From the table of the output media shown in FIG. 10, the CGI program 306 "creator2" generates the following SELECT statements.

```
<SELECT>
<OPTION> select </OPTION>
<OPTION value='TS-W-S'> T-shirt(white)small size </OPTION>
<OPTION value='TS-W-M'> T-shirt(white)medium size </OPTION>
<OPTION value='TS-W-L'> T-shirt(white)large size </OPTION>
<OPTION value='PST-N-A0'> poster(glossy paper)A0 </OPTION>
<OPTION value='PST-L-A0'> poster (laminate)A0 </OPTION>
<OPTION value='PC'> post card </OPTION>
<OPTION value='MC-W'> mug cup(white) </OPTION>
<OPTION value='MC-BLK'> mug cup(black) </OPTION>
</SELECT>
```

In response to a command from the web browser program 702, the CPU 201 in the creator terminal 104 renders the SELECT statement, thereby displaying a selection field 2201, and presenting a drop-down menu 2206 during a drop-down operation, from where options 2207 through 2214 can be selected.

Fields 2202 and 2215 are input and selection fields for the file pathname of the copyrighted data. Furthermore, the fields 2202 and 2215 together form a single file selection control. The creator can enter the file pathname of the copyrighted data directly into the input field 2202 using the keyboard 206 and/or the pointing device 207. The field 2215 also serves as a selection button. In response to an input entered by the creator on the keyboard 206 and/or the pointing device 207, the CPU 201 in the creator terminal 104 receives a command from the web browser program 702, and displays a file selection dialog screen 2217 on the display 205. With any file selected on the file selection dialog screen 2217, the file pathname of the copyrighted data is displayed on the file selection control. The file selection dialog screen 2217 includes a folder and file selection field 2218 and a file name input field 2219. In the folder and file selection field 2218, a folder icon 2222 represents a folder having a hierarchical structure among files in the copyrighted data 703 of the creator terminal 104. A folder name is arranged on the right-hand side of the folder icon 2222. Here, ". ." represents a particular folder, namely, a root file. When the creator inputs a designation of a root folder by operating the keyboard 206 and/or the pointing device 207, the top layer of the hierarchical structure in the copyrighted data 703 is shown. If the designation of a folder other than the root folder is input, a lower layer of the hierarchical structure is shown. In the folder and file selection field 2218, a file icon 2223 represents a file in the copyrighted data 703 of the creator terminal 104. A file name of the file is displayed on the right-hand side of the file icon 2223. When the creator inputs a file operation command using the keyboard 206 and/or the pointing device 207, the CPU 201 in the creator terminal 104 displays the file pathname of the designated file in the file name input field 2219 in response to a command from the web browser program 702. The creator may directly input the file pathname in the file name input field 2219 using the keyboard 206 and/or the pointing device 207. When the creator selects an "OK" button 2220 using the keyboard 206 or the pointing device 207 with the file pathname displayed in the file name input field 2219, the CPU 201 in the creator terminal 104 receives a command from the web browser program 702, and displays, in the file pathname input field 2202, the file pathname that has been displayed in the file name input field 2219. If a "CANCEL" button 2221 is selected, the web browser program 702 issues no command to the CPU 201 in the creator terminal 104.

An input field 2203 and a selection field 2216 are used to input and select a file pathname of the thumbnail copyrighted data respectively, and operate in the same manner as the fields 2202 and 2215. An input field 2204 is used to input a selling price. An "OK" button 2205 is used to implement the options selected in the above described fields.

Returning to the flow of FIG. 19, in step S1907, the creator inputs a value to a commercial item registration screen 2200 displayed by the web browser program 702 of the creator terminal 104, using the keyboard 206 and/or the pointing device 207.

Figure 23:
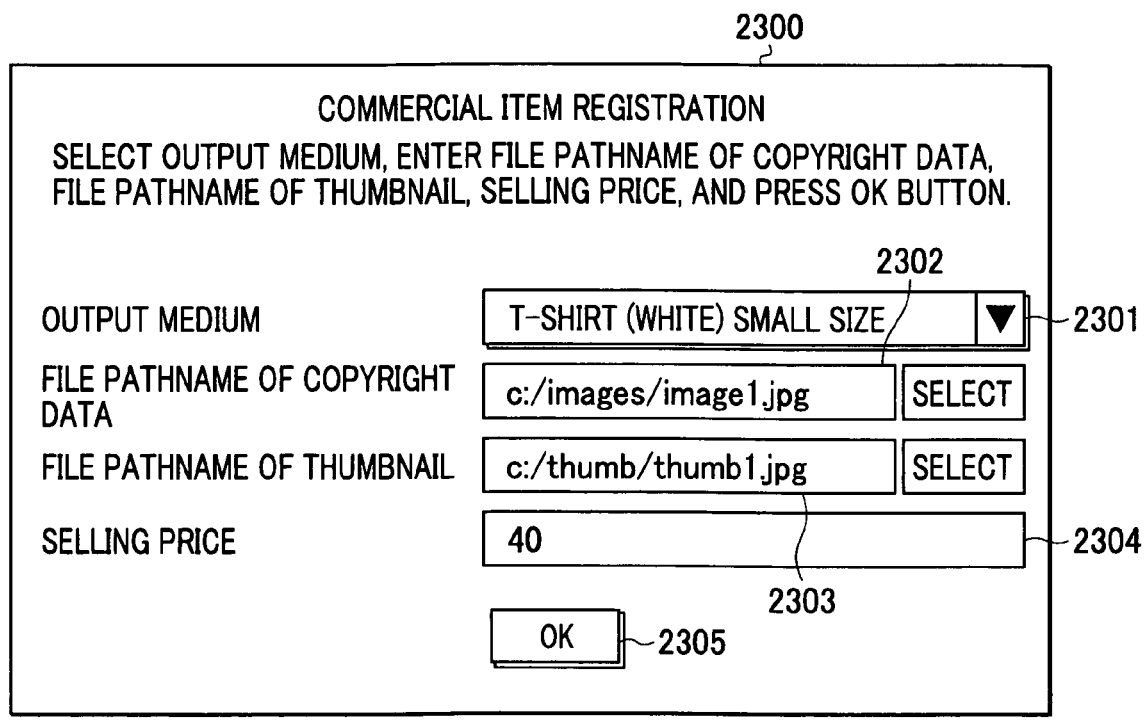
FIG. 23 illustrates an input example of the commercial item registration screen.

FIG. 23 illustrates an example of the commercial item registration screen 2200 having data input thereon. The selected output medium 2301 is "T-shirt (white) small size". Also "c://images/image1.jpg" is the file pathname 2302 of the copyrighted data, "c://thumbs/thumb1.jpg" is the file pathname 2303 of the thumbnail copyrighted data, and "40" is the selling price 2304.

When the creator selects the "OK" button 2305 using the keyboard 206 and/or the pointing device 207, the CPU 201 in the orderer terminal 103 receives a command from the web browser program 702 and sends to the support server 101, via the Internet 102, a commercial item registration processing URL "http://www.server.jp/cgi/creator3" (see the CGI 405 in FIG. 4).In addition, an HTTP request, containing character strings selected and input in the fields 2301-2304, as the argument is also sent. In the output medium 2301, the character string transmitted as the argument is different from the character string to be displayed, and although "T-shirt (white) small size" is selected, the character string to be transmitted as the argument is "TS-W-S" in accordance with the previously described SELECT statement.

Input and selected in the fields 2302 and 2303 are the file pathnames, but the file names and the content of the files are transmitted as the argument. More specifically, the file name "image1.jpg" and the content thereof (see the copyrighted data 801 in FIG. 8) are sent as the copyrighted data, and the file name "thumb1.jpg" and the content thereof (see the thumbnail copyrighted data 803 in FIG. 8) are sent as the thumbnail copyrighted data. Since the argument contains the content of the data, the body of the HTTP request is constructed in the MIME multi-part format as previously described.

The support server 101 receives the transmitted HTTP request via the Internet 102, and associates the commercial item registration processing URL with the CGI program 306 "creator3" on a one-to-one basis (see the CGI 405 in FIG. 4) in response to a command from the web server program 305.

If the file identified by the file pathname input or selected in fields 2302 or 2303 is not found in the copyrighted data 703 of the creator terminal 104, the HTTP request cannot be constructed. The web browser program 702 triggers an error display, and no HTTP request is sent.

Turning to step S1909 of FIG. 19, the CPU 201 in the support server 101 receives a command from the CGI program 306 "creator3", and checks the argument.

In response to a command from the web server program 305, the CPU 201 in the support server 101 inputs the argument of the HTTP request to the CGI program 306 "creator3". Input here are "TS-W-S" as the output medium code, the file name "image1.jpg" and the content thereof (see the copyrighted data 801 in FIG. 8) as the copyrighted data, the file name "thumb1.jpg" and the content thereof (see the thumbnail copyrighted data 803 in FIG. 8) as the thumbnail copyrighted data, and "40" as the selling price.

In response to a command from the CGI program 306 "creator3", the CPU 201 in the support server 101 checks to see whether the output medium code corresponding to the output medium selected in the field 2301 is empty. If it is determined that the output medium code is empty, the CPU 201 in the support server 101 determines the argument is in error, and proceeds to step S1910. If "select" is entered in the field 2301, the argument sent is deemed to be empty.

In response to a command from the CGI program 306 "creator3", the CPU 201 in the support server 101 checks to see if the output medium code is correct. Since the values of the arguments to be sent are listed in OPTION statement in the field 2301, only the values already designated using the OPTION statement must be transmitted. However, there is a possibility that the HTTP request could be altered by a third party prior to the request being transmitted. For this reason, the CPU 201 in the support server 101 searches for the record in the output medium database 301 using the output medium ID as a key in response to a command from the CGI program 306 "creator3" and a command from the data base program 308. If no corresponding record is found, the CPU 201 in the support server 101 determines that the argument is in error, and proceeds to step S1910. If the corresponding record is found, that record is designated as "A" to be used in subsequent checks. Since "TS-W-S" is input as the output medium code, the record 1001 is found from the records of the output medium database 301 (see FIG. 10).

The CPU 201 in the support server 101 checks the content of the copyrighted data (see the copyrighted data 801 in FIG. 8) input or selected in the field 2302. If the copyrighted data is image data, the support server 101 checks the resolution of the image data. The permissible resolution (height) and the permissible resolution (width) are designated in the record "A" found in the output medium search. Referring to the record 1001 in FIG. 10, the permissible resolution (height) is 1200 pixels, and the permissible resolution (width) is 800 pixels. As shown in the field 801 in FIG. 8, the content of the image data input in the argument indicates 1200 pixels in a height dimension and 800 pixels in a width dimension, and the CPU 201 in the support server 101 determines that the check result is successful. If the resolution is found to be inappropriate, the CPU 201 in the support server 101 determines that the content of the copyrighted data is in error, and proceeds to step S1910.

The CPU 201 in the support server 101 checks the selling price input in the field 2304. The record "A" found in the output medium search designates the cost (i.e., minimum selling price). Referring to the record 1001 in FIG. 10, "30" is the cost in the output medium code "TS-W-S". The CPU 201 in the support server 101 checks whether the input selling price is equal to or higher than the cost (i.e., minimum selling price). If the selling price designated by the argument is empty, or lower than the cost (i.e., minimum selling price), the CPU 201 in the support server 101 determines that the check result is failure, and proceeds to step S1910. Since "40" is input here, the check result is successful.

In step S1910, the CPU 201 in the support server 101 outputs HTML data representing an error screen in response to a command from the CGI program 306 "creator3". In response to a command from the web server program 305, the CPU 201 in the support server 101 sends an HTTP response.

In response to the web browser program 702, the CPU 201 in the creator terminal 104 receives the HTTP response, and renders the HTTP response on the display 205 of the creator terminal 104. The rendered HTTP response is a commercial item registration screen 2300 shown in FIG. 23 with a message indicating an error added thereto.

In step S1911, the CPU 201 in the support server 101 registers the commercial item record (see FIG. 12) to the commercial item database 303 in response to a command from the CGI program 306 "creator3".

In response to a command from the CGI program 306 "creator3", the CPU 201 in the support server 101 performs a issuing process for a new commercial item ID 1202. As shown in FIG. 12, the commercial item ID 1202 in combination with the creator ID 1201 is designated as a PK. The commercial item ID 1202 must be issued in a manner such that no commercial item ID 1202 is duplicated among a plurality of records having the same creator ID 1201. Here, the commercial item ID has a numerical format, and a newly issued commercial item ID must always be larger in number than an already issued commercial item ID. More specifically, in response to a command from the CGI program 306 "creator3", the CPU 201 in the support server 101 searches for a record in the data base program 308 using the creator ID "XXX" as a key, successively references the found records of the found commercial items ID 1202, and sets the maximum value thereof plus 1 as a newly issued commercial item ID. If none of the records is found, "1001" is entered. Here, the commercial item ID starts with "1001".

The method of issuing the commercial item ID is not limited to the one described above. A sequencing function (i.e., a serial numbering function of the database management) may be prepared and used for each creator ID in the commercial item database 303. A single sequencing function may be prepared in the entire commercial item database 303, and may be commonly used for all creator IDs. Alternatively, a unique value may be generated for the commercial item ID using time or a random number. Any method of issuing the commercial ID that would allow practice of the present invention is acceptable as long as a unique commercial item ID is assured for each creator ID.

In response to a command from the CGI program 306 "creator3", the CPU 201 in the support server 101 performs a storage process for storing the copyrighted data and the thumbnail copyrighted data. With the file name "image1.jpg" of the copyrighted data input by the argument, the creator ID "XXX", and the commercial item ID "1001", a stored file pathname becomes "/var/images/XXX/1001/image1.jpg" in accordance with the file pathname generation rule 501 shown in FIG. 5. With the file name "thumb1.jpg" of the thumbnail copyrighted data input by the argument, the creator ID "XXX", and the commercial item "1001", a stored pathname is "var/thumbs/XXX/1001/thumb1.jpg" in accordance with the file pathname generation rule 502 shown in FIG. 5.

In response to a command from the CGI program 306 "creator3", the CPU 201 in the support server 101 produces new files, identified by the generated file pathname, in the copyrighted database 307, and stores the files having the contents of the copyrighted data and the thumbnail copyrighted data input by the respective arguments.

The CPU 201 in the support server 101 adds a new record to the commercial item database 303 in response to a command from the CGI program 306 "creator3" and a command from the data base program 308. As previously described, the commercial item database 303 has the record structure as shown in FIG. 12. The creator ID acquired from the session data is registered in the creator ID 1201 of the record, the newly issued commercial item ID is registered in the commercial item ID 1202 of the record, the output medium code corresponding to the selection in the field 2301 is registered in the output medium code 1203 of the record, the copyrighted data URL input in the field 2302 is registered in the copyrighted data URL 1204 of the record, the thumbnail copyrighted data URL input in the field 2303 is registered in the thumbnail copyrighted data URL 1205 of the record, and the selling price input in the field 2304 is registered in the selling price 1206 of the record.

In step S1912, the record is registered in the commercial item database 303. In response to a command from the CGI program 306 "creator3", the CPU 201 in the support server 101 outputs HTML data representing a registration result screen. In response to a command from the web server program 305, the CPU 201 in the support server 101 sends an HTTP response to the creator terminal 104 via the Internet 102.

In response to a command from the web browser program 702, the CPU 201 in the creator terminal 104 receives the HTTP response, and renders the HTTP response on the display 205 of the creator terminal 104.

Figure 24:
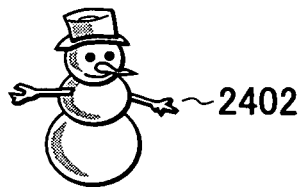
FIG. 24 illustrates a commercial item registration result screen.

FIG. 24 shows the rendered HTTP response. An output medium 2401 is the one selected in the field 2301, thumbnail copyrighted data 2402 is the one input or selected in the field 2303, and a selling price 2403 is the one input in the field 2304.

The thumbnail copyrighted data 2402 will now be discussed. The thumbnail copyrighted data 2402 is presented by designating the call of the thumbnail acquisition CGI 409 (see FIG. 4) as an SRC attribute of <IMG> statement of the HTML. The call format of the thumbnail acquisition CGI 409 takes the creator ID and the commercial item ID as the arguments as shown in the field 503 in FIG. 5, and is as follows:

"http://www.server.jp/cgi/getThumb?cid=XXX&pid=1001". When the HTML data is rendered, the CPU 201 in the creator terminal 104 sends an HTTP request for the URL to the support server 101 via the Internet 102 in response to a command from the web browser program 702. In response to a command from the web server program 305, the CPU 201 in the support server 101 receives the sent HTTP request, and associates the URL with the CGI program 306 "getThumb" on a one-to-one basis (see the CGI 409 in FIG. 4). Upon receiving a command from the CGI program 306 "getThumb" and a command from the database program 308, the CPU 201 in the support server 101 searches the commercial item database 303 using the creator ID and the commercial item ID of the argument as a key. The file pathname of the thumbnail copyrighted data is determined to be "/var/thumbs/XXX/1001/thumb1.jpg" using the file name 1205 "thumb1.jpg" of the thumbnail copyrighted data of the found record and mapping 502 shown in FIG. 5. The CGI program 306 "getThumb" reads the file identified by the file pathname from the copyrighted database 307, and outputs the content of the copyrighted data. As in step S1902, the CPU 201 in the support server 101 sends an HTTP response to the creator terminal 104 via the Internet 102 in response to a command from the web server program 305. In response to a command from the web browser program 702, the CPU 201 in the creator terminal 104 receives the HTTP response, and renders the thumbnail copyrighted data 2402 on the display 205 of the creator terminal 104.

The copyrighted data, sent in step S1907 of FIG. 19, is stored in a cache in the external storage device 204, and may be reused another time when a commercial item is registered to the same URL. The same cache may also be used when the copyrighted data is output to the output medium after ordering.

In step S1907 of FIG. 19, the copyrighted data and the thumbnail copyrighted data are sent from the creator terminal 104 to the support server 101. Since the support server 101 can generate the thumbnail copyrighted data from the copyrighted data, only the copyrighted data may be sent in step S1907 and the support server 101 may generate the copyrighted data. The support server 101 may combine the output medium designated in the field 2201 and the thumbnail copyrighted data on the commercial item registration screen 2200 before displaying the output medium and the thumbnail copyrighted data. For example, a commercial item sample of a T-shirt having the thumbnail copyrighted data combined therewith may be displayed.

An ordering process of an orderer will now be discussed with reference to FIGS. 25 through 32.

FIG. 25 is a table listing records registered by the creator with the creator ID "XXX" in the commercial item database 303. Records 2501-2504 store information relating to commercial items registered in the above-referenced commercial item registration process. The commercial items are designated by commercial IDs 1001-1004.

The copyrighted data 801 and the thumbnail copyrighted data 803 shown in FIG. 8 are registered in the fields 2502 and 2503. The copyrighted data 802 and the thumbnail copyrighted data 804, shown in FIG. 8, are registered in the field 2504.

Figure 26:
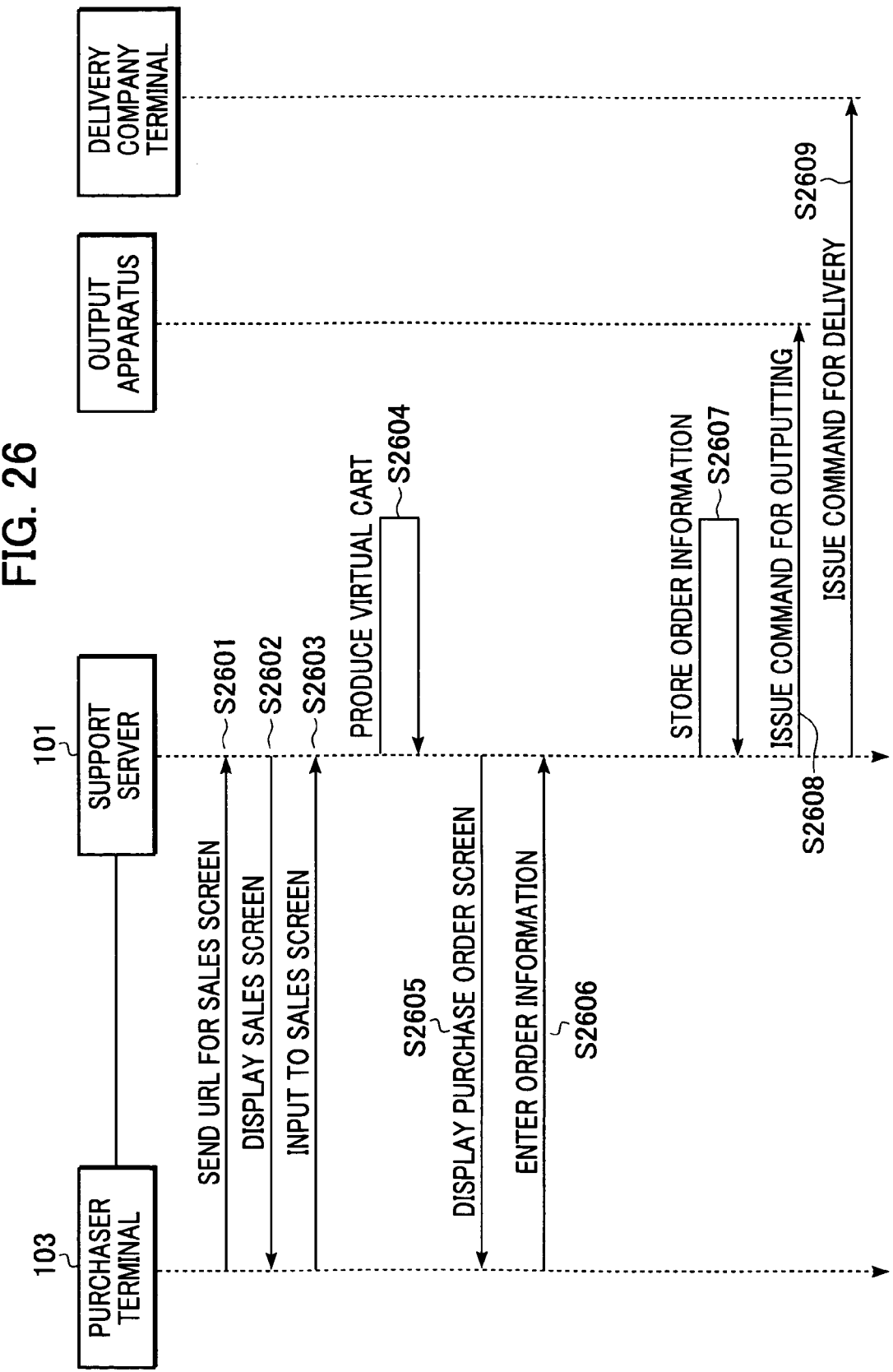
FIG. 26 illustrates an order sequence.

FIG. 26 illustrates a sequence of the ordering process.

In step S2601, the CPU 201 in the purchaser (i.e., orderer) terminal 103 initiates the web browser 602. By operating keyboard 206 and/or the pointing device 207, an orderer inputs a sales screen displaying URL "http://www.server.jp/cgi/view?cid=XXX" (see the CGI 406 in FIG. 4). In response to a command from the web browser 602, the CPU 201 in the orderer terminal 103 sends an HTTP request containing a sales screen displaying page URL to the support server 101 via the Internet 102.

In response to a command from the web server program 305, the CPU 201 in the support server 101 receives the HTTP request, and associates the sales screen displaying URL with the CGI program 306 "view" on a one-to-one basis (see the CGI 406 in FIG. 4).

In step S2602, the CPU 201 in the support server 101 outputs HTML data forming the sales screen on command from the CGI program 306 "view".

Figure 27:
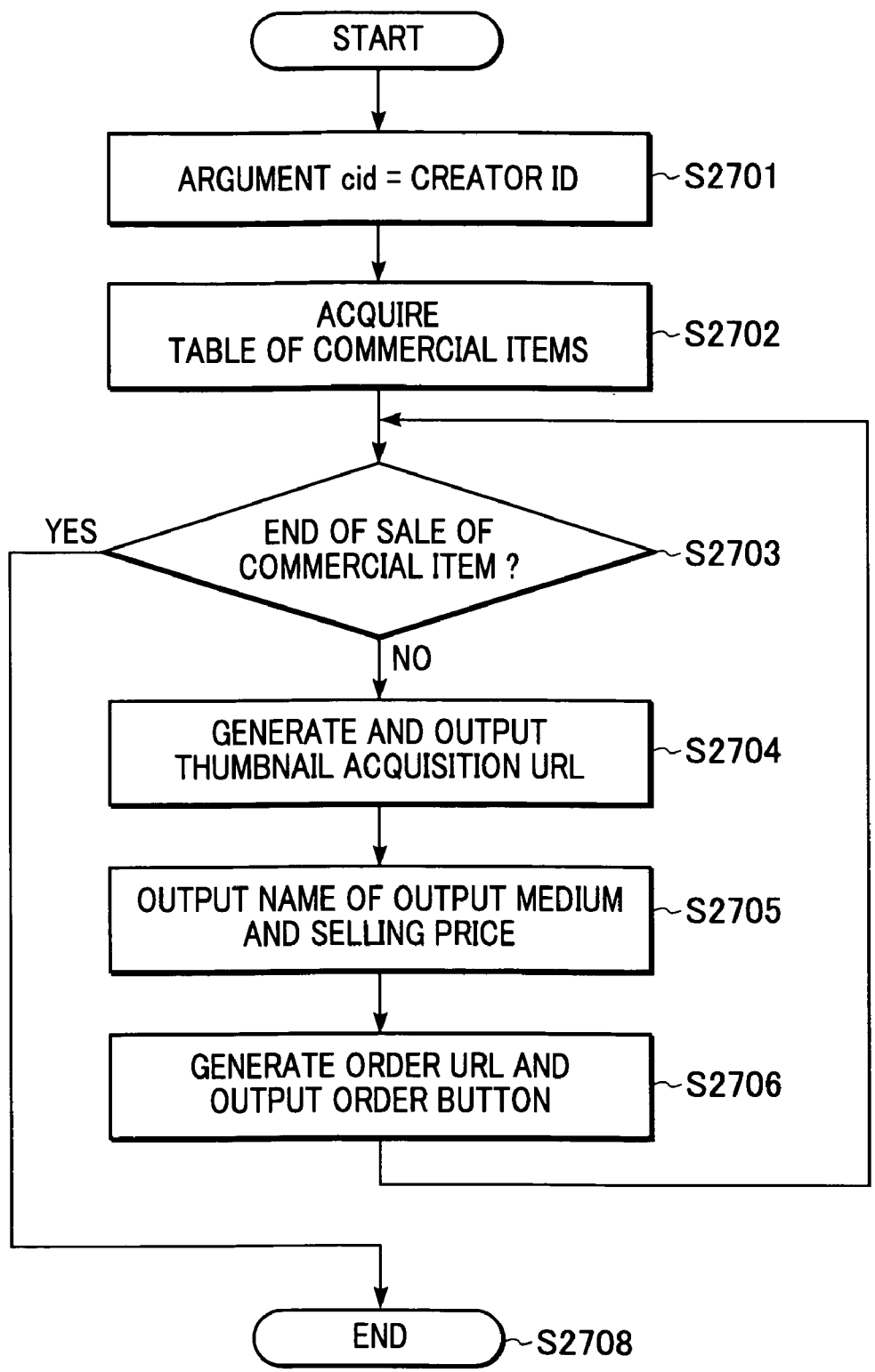
FIG. 27 is a flowchart of a process for generating a sales screen.

This process will now be discussed with reference to the flowchart shown in FIG. 27.

In step S2701, the CPU 201 in the support server 101 inputs the argument of the HTTP request to the CGI program 306 "view" on command from the web server program 305. Here, the argument is "cid=XXX", where the value "XXX" is a creator ID.

The CPU 201 in the support server 101 outputs a head portion of the HTML data on command from the CGI program 306 "view". An example of the HTML data is described below. In the following example, "YYY" means that the value of the argument is used and output as is.

```
<HTML>
<HEAD>
<TITLE> Welcome to "YYY" sales page!</TITLE>
</HEAD>
<BODY>
<P> Welcome to "YYY" sales page </P>
<TABLE>
```

In step S2702, the CPU 201 in the support server 101 searches the commercial item database 303 using the creator ID "XXX" obtained in step S2701 in response to a command from the CGI program 306 "view" and a command from the database program 308. In accordance with the first preferred embodiment, a table of records is obtained as shown in FIG. 25.

In response to a command from the CGI program 306 "view", the CPU 201 in the support server 101 determines in step S2703 whether all steps of the sale of a commercial item (S2704-S2706) have been completed in connection with the table of the commercial items acquired in step S2702.

If, in step S2703, it is determined that all steps have been completed, the CPU 201 in the support server 101 proceeds to step S2708 and the process ends.

If, in step S2703, it is determined all steps have not been completed, the CPU 201 in the support server 101 selects one commercial item from among a list of unprocessed commercial items, and proceeds to step S2704. Here, the commercial item listed in the record 2501 shown in FIG. 25 is selected.

In step S2704, the CPU 201 in the support server 101 generates and outputs a thumbnail acquisition URL of the commercial item selected in step S2703. Since the call format of the thumbnail acquisition CGI 409 (see FIG. 4) takes the creator ID and the commercial item ID as the argument as shown in the field 503 in FIG. 5, the URL becomes "http://www.server.jp/cgi/getThumb?cid=XXX&pid=1001" in accordance with the creator ID "XXX" acquired in step S2701 and the commercial item ID "1001" of the commercial item 2501 selected in step S2703. The CPU 201 in the support server 101 uses the generated URL as the SRC attribute of the <IMG> statement, and outputs the HTML data. The following is an example of the outputted HTML data.

```
<TR>
<TD>
<IMG SRC>
"http://www.server. jp/cgi/getThumb?cid=XXX&pd=1001" />
<TD>
```

In step S2705, the CPU 201 in the support server 101 outputs the name of the output medium and the selling price of the commercial item selected in step S2703. In response to a command from the CGI program 306 "view", the CPU 201 in the support server 101 searches the output medium database 301 using the output medium code "TS-W-S" as a key, and acquires and outputs the output medium name "T-shirt (white) small size" of a found record 1001 in FIG. 10. In response to a command from the CGI program 306 "view", the copyrighted database 307 inserts delimiter "," every three digits to the selling price "40", and finally adds "$" as the unit of currency. The result is as follows:

```
<TD>
T-shirt (white) small size <BR/> $40
</TD>
```

In step S2706, the CPU 201 in the support server 101 generates an order URL of the commercial item selected in step S2703, and outputs HTML data to display an order button linked thereto. Since the call format of the thumbnail acquisition CGI 407 (see FIG. 4) takes the creator ID represented by the argument name "cid=" and the commercial item ID represented by the argument name "pid=", the URL becomes "http://www.server.jp/cgi/order1?cid=XXX&pid=1001" in accordance with the creator ID "XXX" acquired in step S2701 and the commercial item ID "1001" of the commercial item 2501 selected in step S2703. The CPU 201 in the support server 101 outputs HTML data of the order button to call the generated order URL. One example of the HTML data is as follows:

```
<TD>
<FORM ACTION=
"http://www.server.jp/cgi/order1?cid=XXX&pid=1001"
<INPUT TYPE="SUBMIT" VALUE="Put into cart"/>
</FORM>
</TD>
</TR>
```

The CPU 201 in the support server 101 returns to step S2703, and repeats the same process for all unprocessed commercial items.

In step S2708, the CPU 201 in the support server 101 outputs a tail portion of the HTML data as described below when all commercial items have been processed

```
</TABLE>
</BODY>
</HTML>
```

The CPU 201 in the support server 101 outputs the HTML data in this way.

Figure 28:
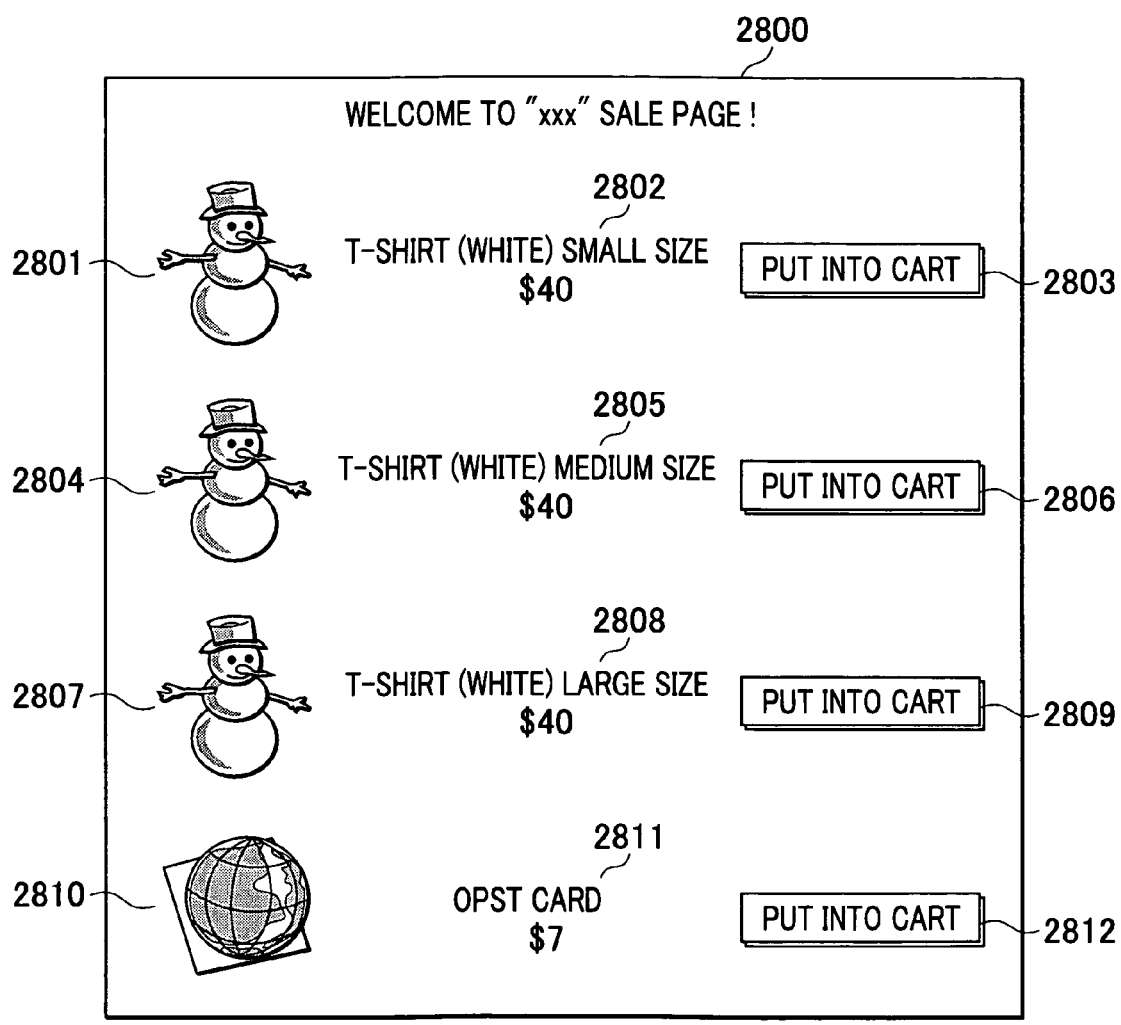
FIG. 28 illustrates the sales screen.

In response to a command from the web server program 305, the CPU 201 in the support server 101 sends, to the orderer terminal 103, an HTTP response having the above-mentioned output HTML data as the body thereof via the Internet 102. In response to a command from the web browser 602, the orderer terminal 103 receives the HTTP response, and renders the HTML data as the body of the HTTP response on the display 205 of the orderer terminal 103. FIG. 28 illustrates the rendered HTTP data.

Returning to FIG. 26, in step S2603, an orderer selects "put into cart" buttons 2803, 2806, 2809, and 2812 on a sales screen 2800 as shown in FIG. 28. The sales screen 2800 is presented on the web browser 602 of the orderer terminal 103, and selection of "put into cart" buttons 2803, 2806, 2809, and 2812 is done via the keyboard 206 and/or the pointing device 207. When a "put into cart" button is selected, the CPU 201 in the orderer terminal 103 receives a command from the web browser 602 and sends to the support server 101, via the Internet 102, an HTTP request containing a link destination URL designated by the "put into cart" button.

For example, the "put into cart" button 2803 is linked with the link destination URL "http://www.server.jp/cgi/order1?cid=XXX&pid=1001". If "put into cart" button 2803 is selected, the CPU 201 in the orderer terminal 103 sends to the support server 101, via the Internet 102, an HTTP request containing the URL. In response to a command from the web server program 305, the CPU 201 in the support server 101 receives the HTTP request, and associates the URL with the CGI program 306 "order1" on a one-to-one basis (see the CGI 407 in FIG. 4).

In step S2604, the CPU 201 in the support server 101 receives a command from the CGI program 306 "order1", and checks to see if a session is initiated with the orderer terminal 103.

If a session is not initiated, the CPU 201 in the support server 101 issues a unique order ID, and adds a new record (see FIG. 13) to the order database 304 in response to a command from the database program 308. The CPU 201 in the support server 101 sets the newly issued order ID to the order ID 1301 of the newly added record, the creator ID "XXX" designated by the argument "cid=XXX" to the creator ID 1302 of the newly added record, and the commercial item ID "1001" to the commercial item ID #1 1306 of the newly added record, and sets the order flag 1313 of the newly added record to "OFF".

The method of issuing the new order ID is identical to the method of issuing the new commercial item ID. The order ID has a numerical format, and a newly issued order ID must always be larger in number than an already issued order ID. More specifically, in response to a command from the CGI program 306 "order1", the CPU 201 in the support server 101 searches all records of the order database 304 in accordance with the database program 308, successively references the found records of the found order IDs 1301, and sets the maximum value thereof plus 1 as a newly issued order ID. If none of the records is found, "1001" is entered. The method of issuing the new order ID is not limited to this method, and any method that would allow practice of the present invention is applicable.

If a session is initiated, the order ID is already attached as cookie as will be discussed below. In response to a command from the CGI program 306 "order1", the CPU 201 in the support server 101 acquires the order ID from the HTTP request using the cookie. The CPU 201 in the support server 101 searches the records of the order database 304 using the order ID as a key in response to a command from the CGI program 306 "order1" and a command from the database program 308. In response to a command from the CGI program 306 "order1", the CPU 201 in the support server 101 compares the creator ID 1302 of the found record (see FIG. 13) with the creator ID "XXX" designated by the argument "cid=XXX".

If the creator IDs fail to match, the order ID is already associated with the commercial item of another creator. The CPU 201 in the support server 101 issues a new order ID in the same manner as the new order.

If the creator IDs match each other, the CPU 201 in the support server 101 adds the commercial item ID "1001" designated by the argument "pid=1001" to the found record. For example, if a commercial item #1 , a commercial item #2 , and a commercial item #3 are present in the found record, the CPU 201 in the support server 101 adds a commercial item #4 (see FIG. 13).

The current state of the content of the order database 304 is shown in FIG. 31, for example. A unique order ID 3101 is "1001". A creator ID 3102 is "XXX". Commercial items IDs 3106-1 and 3106-2 mean that two items are added. The commercial item ID of the commercial item 3106-1 is "1002", and corresponds to the commercial item 2502 in FIG. 25. The commercial item ID of the commercial item 3106-2 is "1004", and corresponds to the commercial item 2504 in FIG. 25. An order flag 3113 is "OFF".

Returning to the flow of FIG. 26, in step S2605, the CPU 201 in the support server 101 receives a command from the CGI program 306 "order1" and outputs HTML data representing an order screen that displays a current content of a virtual cart in response to the record of the order database 304 shown in FIG. 31 and receives an order of a commercial item. In response to a command from the web server program 305, the CPU 201 in the support server 101 sends to the orderer terminal 103, via the Internet 102, an HTTP response having order screen displaying HTML data as the body thereof. In response to a command from the CGI program 306 "order1", the CPU 201 in the support server 101 attaches the order ID as cookie to the HTTP response. In response to a command from the web browser 602, the CPU 201 in the orderer terminal 103 receives the HTTP response, and renders the order screen displaying HTML data as the body of the HTTP response on the display 205 of the orderer terminal 103. In response to a command from the web browser 602, the CPU 201 in the orderer terminal 103 stores the attached cookie onto the internal memory 202 or the external storage device 204.

Figure 29:
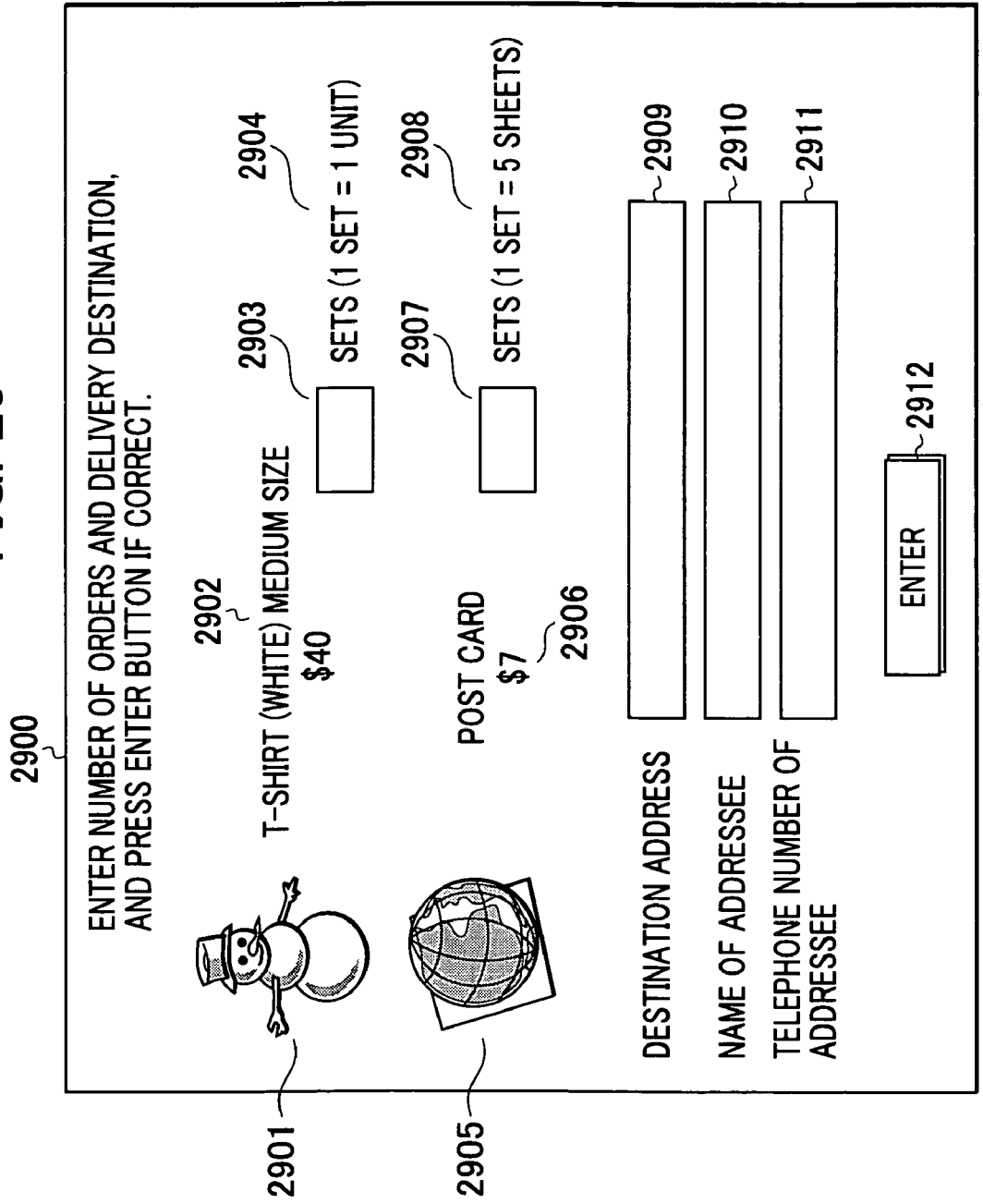
FIG. 29 illustrates an order screen.

FIG. 29 illustrates the rendered order screen displaying HTML data. An order screen 2900 is constructed using the form function of the HTML. Designated here as a destination URL of the HTTP request is an order content input URL "http://www.server.jp/cgi/order2" (see the CGI 408 in FIG. 4).

Information 2901-2904 is generated when the CPU 201 in the support server 101 receives a command from the CGI program 306 "order1" and outputs the HTML data for displaying information of the commercial item corresponding to the commercial item ID #1 3106-1 on the order database 304 (see FIG. 31). In response to a command from the CGI program 306 "order1", and a command from the database program 308, the CPU 201 in the support server 101 searches the records in the commercial item database 303 using the creator ID 3102 "XXX" and the commercial item ID #1 3106-1 "1002" as keys. As a result, the CPU 201 in the support server 101 obtains the record 2502 shown in FIG. 25. In response to a command from the CGI program 306 "order1", the CPU 201 in the support server 101 generates a URL as in step S2704, and uses the URL as the SRC attribute of the <IMG> statement so that the thumbnail copyrighted data of the found record 2502 is shown as something like the image 2901. In response to a command from the CGI program 306 "order1", the CPU 201 in the support server 101 generates the output medium name and the selling price corresponding to the found record 2502 as in step S2705 so that the information 2902 is displayed. The field 2903 receives an order quantity 3107 of the commercial item ID #1 3106, and designates the argument of the HTTP request. In response to a command from the CGI program 306 "order1" and a command from the database program 308, the CPU 201 in the support server 101 searches the output medium database 301 using the output medium code "TS-W-M" of the commercial item 2502 as a key, and generates the name of unit of orders, the name of unit of commercial items, and the number of commercial items per purchase order (set (1 set=1 unit)) of the found record 1002 to display these pieces of information. Likewise, information 2905-2908 is generated when the CPU 201 in the support server 101 receives a command from the CGI program 306 "order1" and outputs the HTML data as information of the commercial item corresponding to the current content of the order database 304 (see FIG. 31). A field 2907 receives an order quantity 3107-2 of the commercial item ID #2 3106-2. Input fields 2909-2911 designate arguments of the HTTP request. The input field 2909 is for an address of a delivery destination, the input field 2910 is for a name of the addressee, and the input field 2911 is for a telephone number of the addressee. The function of "Enter" button 2912 is described below with respect to "Enter" button 3012 of FIG. 30.

In step S2606, the CPU 201 in the orderer terminal 103 enters values to the order screen 2900 displayed in response a command from the web browser 602 when the orderer inputs an operational input by operating the keyboard 206 and/or the pointing device 207.

Figure 30:
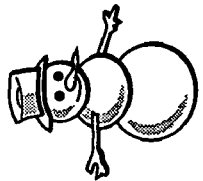
FIG. 30 illustrates an input example of the order screen.

FIG. 30 illustrates the order screen 2900 having input values received thereon. Here, "2" sets are entered for the order quantity 3003 of the commercial item ID #1 3106-1, "1" set is entered for the order quantity 3007 of the commercial item ID #2 3106-2, "Imaiuemachi Nakahara-ku, Kawasaki-shi" is entered for the address of the delivery destination 3009, "Hanako Kosugi" is entered for the name of the addressee 3010, and "044-xxx-xxxx" is entered for the telephone number of the addressee 3011.

When the orderer selects "Enter" button 3012 via the keyboard 206 and/or the pointing device 207, the CPU 201 in the orderer terminal 103 receives a command from the web browser 602, and sends to the support server 101, via the Internet 102, an order content input URL "http://www.server.jp/cgi/order2" (see the CGI 407 in FIG. 4), and an HTTP request having character strings input in fields 3003, 3007, 3009-3011 as the argument.

In response to a command from the web server program 305, the CPU 201 in the support server 101 receives the HTTP request, and associates the order content input URL with the CGI program 306 "order2" on a one-to-one basis (see the CGI 408 in FIG. 4).

In step S2607, the CPU 201 in the support server 101 inputs the argument of the HTTP request to the CGI program 306 "order2" in response to a command from the Web server program 305. Input here are "2" as the order quantity of the commercial item ID #1, "1" as the order quantity of the commercial item ID #2, "Imaiuemachi Nakahara-ku Kawasaki-shi" as the address of the delivery destination, "Hanako Kosugi" as the name of the addressee, and "044-xxx-xxxx" as the telephone number of the addressee.

Since the session is initiated in step S2604, the CPU 201 in the support server 101 acquires the order ID from the HTTP request using the cookie. In response to a command from the CGI program 306 "order2" and a command from the copyrighted database 307, the CPU 201 in the support server 101 searches the records of the order database 304 using the acquired order ID as a key. As a result, a record shown as shown in FIG. 32 is obtained. In response to a command from the CGI program 306 "order2", the CPU 201 in the support server 101 registers the delivery destination "Imaiuemachi Nakahara-ku Kawasaki-shi" of the argument as the delivery destination 3203, the name of the addressee "Hanako Kosugi" of the argument as the name of the addressee 3204, the telephone number of the addressee "044-733-6111" of the argument as the telephone number of the addressee 3205, the order quantity "2" of the commercial item ID #1 as the quantity #1 3207, and the order quantity "1" of the commercial item ID #2 as the quantity #2 3209.

In response to a command from the CGI program 306 "order2" and a command from the database program 308, the CPU 201 in the support server 101 searches the records of the commercial item database 303 using the creator ID 3101 "XXX" and the commercial item ID 3106-1 "1002" as keys, and acquires the selling price "40" of the commercial item record 2502. Similarly, the CPU 201 in the support server 101 acquires the selling price "7" of the commercial item ID #2 3106-2 "1004". A sum of purchase 3210 of "87" is registered, which is determined by summing the product of the selling price of "40" of the commercial item #1 and the order quantity "2", and the product of the selling price of "7" of the commercial item #2 and the order quantity "1". A consumption tax 3211 of "4" is registered, which is calculated by multiplying the sum of purchase "87" by a consumption tax rate (5% here).

In response to a command from the CGI program 306 "order 2" and a command from the database program 308, the CPU 201 in the support server 101 searches the records of the commercial item database 303 using the order ID 3101 "XXX" and the commercial item ID 3106-1 "1002" as keys. The CPU 201 in the support server 101 acquires the commercial item record 2502. In response to a command from the CGI program 306 "order 2" and a command from the database program 308, the CPU 201 in the support server 101 searches the output medium database 301 using the output medium code "TS-W-M" as a key. The CPU 201 in the support server 101 finds the cost (i.e., minimum selling price) "30" of the output medium record 1002 (see FIG. 10). Similarly, the CPU 201 in the support server 101 finds the cost (i.e., minimum selling price) "5" of the commercial item ID #2 3106-2 "1004". A sum of cost 3212 of "65" is registered, which is determined by summing the product of the cost "30" and the order quantity "2" of the commercial item #1, and the product of the cost of "5" and the order quantity "1" of the commercial item #2. In response to a command from the CGI program 306 "order 2", the CPU 201 in the support server 101 registers "ON" for the order flag 3213 to complete the ordering operation.

Returning to FIG. 26, in step S2608, the CPU 201 in the support server 101 searches for order records having the order flag 1313 "ON", thereby acquiring the commercial item #1 1306-1 through the commercial item #n 1306-n. The CPU 201 in the support server 101 communicates with an output apparatus to command the output apparatus to output the copyrighted data in accordance with the content of the commercial item #1 1306-1 through the commercial item #n 1306-n. In response to the command, the output apparatus produces the commercial items #1 through #n.

If the commercial item ID #n (1306-n) is "1001", the support server 101 commands the output apparatus to output the copyrighted data "image1.jpg" onto the output medium identified by the output medium code "TS-W-S" to produce the commercial item. In response, the output apparatus produces the commercial item.

The support server 101 is connected to a variety of output apparatuses such as a printing apparatus and a voice recording apparatus via a network, and can communicate the copyrighted data via a secure link.

In step S2609, the CPU 201 in the support server 101 communicates with a computer of a delivery company of the commercial item through the network to notify of the content of the "address of the delivery destination 1303", the "name of the addressee 1304", and the "telephone number of the addressee 1305". The CPU 201 in the support server 101 thus instructs the delivery company to deliver the produced commercial items #1-#n to the delivery destination. In response to the command from the support server 101, the computer of the delivery company prints the "address of the delivery destination 1303", the "name of the addressee 1304", and the "telephone number of the addressee 1305" on an invoice using a printer connected thereto. The computer of the company may also display the delivery destination 1304", the "name of the addressee 1304", the "telephone number of the addressee 1305" on a display. The company then packs and ships the commercial items.

The CPU 201 in the support server 101 instructs a computer of a bank to bill and collect the sum, namely, the "sum of purchase" 1310 plus the "consumption tax" 1311 from the orderer. The CPU 201 in the support server 101 also instructs the computer of the bank to pay the sum equal to the "sum of purchase" 1310 minus the "sum of cost" 1312 to the creator identified by the creator ID 1302. The CPU 201 in the support server 101 notifies the computer of the bank of the "payment destination bank" 1108, the "payment destination bank depot" 1109, the "type of account at the payment destination bank" 1110, the "account number at the payment destination bank" 1111, and the "name of the holder of the account at the payment destination bank" 1112 as the payment destination in the creator database 302. The support server 101 and the computer of the bank, connected via a network, can communicate with each other via a secure link.

The billing and collection of the sum from the orderer may be settled on an on-line storefront payment or a credit card at a bank or a convenience store. Billing and collection of the sum from the orderer is not limited to these methods, and any method for collecting the sum that would allow practice of the present invention is applicable.

In the first preferred embodiment of the present invention, the communication protocol to the Web server is always HTTP. The present invention is not limited to the HTTP, and any communication protocol that would enable practice of the present invention is applicable. Since personal information is contained in communication data, a secure protocol such as HTTPS is preferably used.

Each of the support server 101, the orderer terminal 103, and the creator terminal 104 may include one or a plurality of computers.

In the first preferred embodiment of the present invention, the copyrighted data is image data, and the commercial item is an output medium such as a T-shirt or a mug cup on which the image data is printed. The present invention is also applicable to other commercial items. For example, as a commercial item, audio data or video data may be recorded onto an output medium such as a compact disk (CD).

Second Preferred Embodiment

Figure 33:
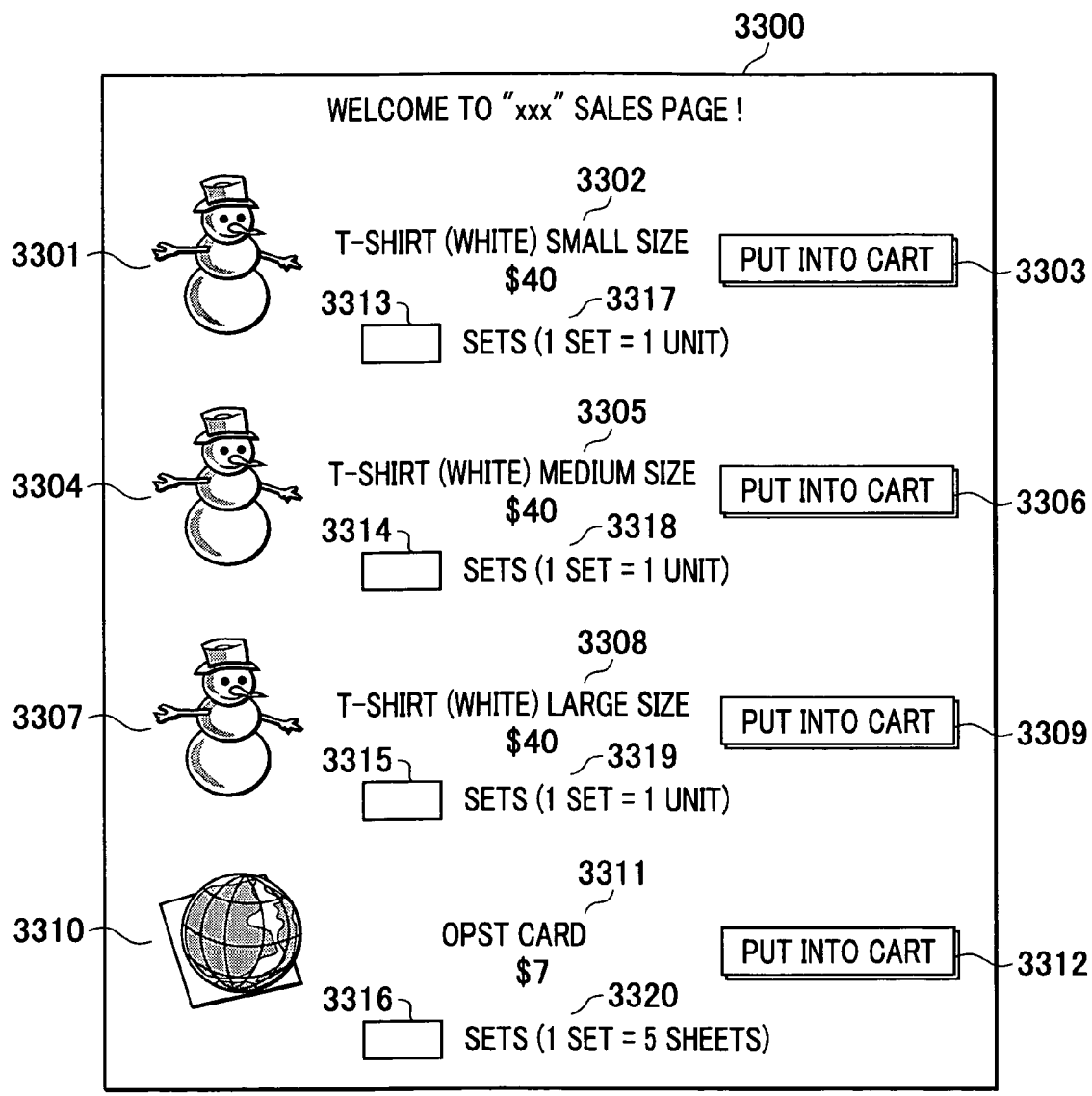
FIG. 33 illustrates a sales screen.

In a second preferred embodiment, in step S2602, the CPU 201 in the support server 101 generates HTML data for displaying a sales screen 3300 shown in FIG. 33 rather than the sales screen 2800 in the first preferred embodiment, and sends the HTML data to the orderer terminal 103. In response to selection of the order button from the orderer terminal 103, the CPU 201 in the support server 101 instructs an output system to produce a commercial item. The discussion of the elements identical to those already discussed in connection with the first preferred embodiment is omitted here, and only the difference between the first and second preferred embodiments is discussed.

Figure 36:
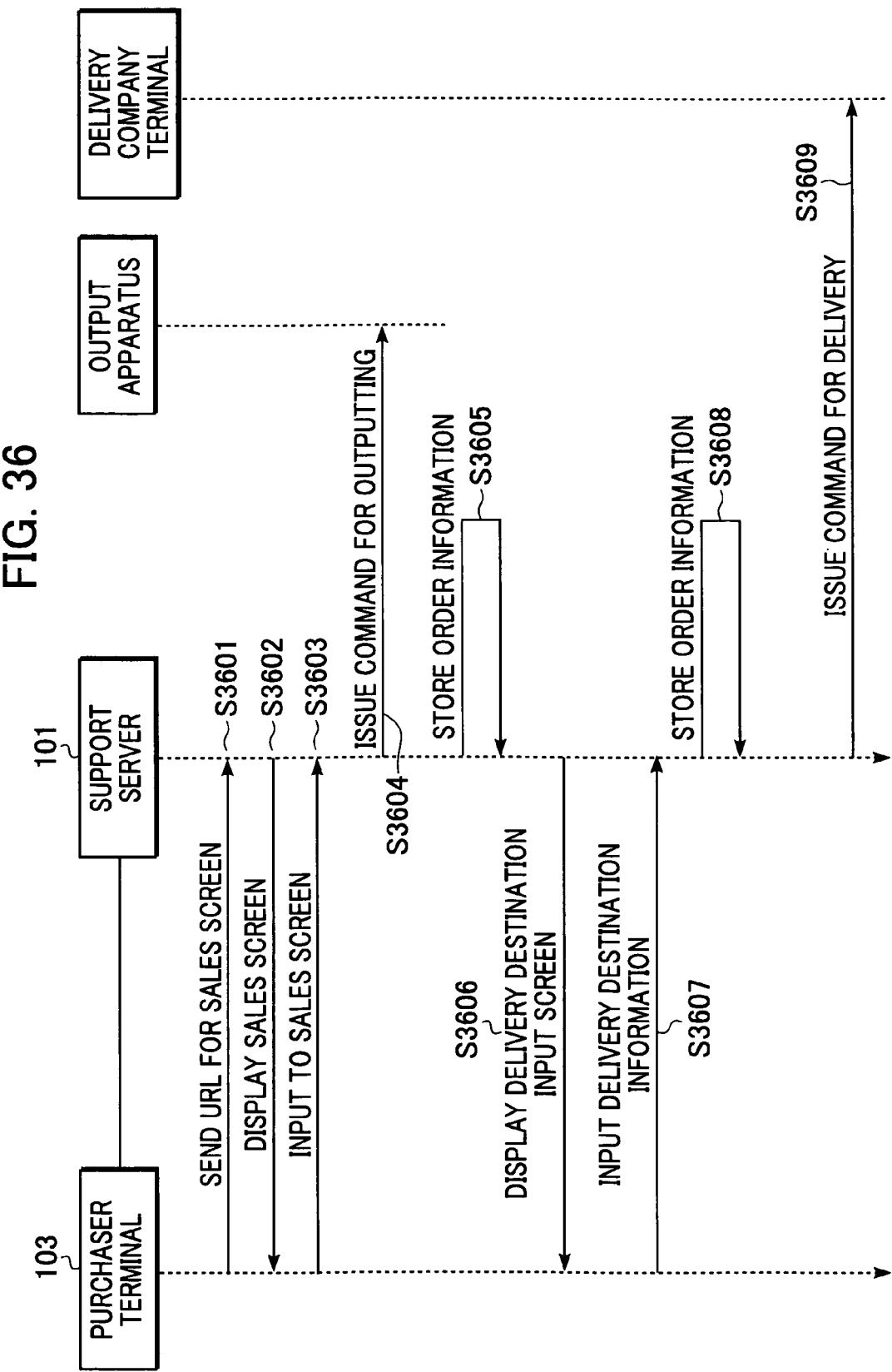
FIG. 36 illustrates an order sequence.

FIG. 36 illustrates a sequence of an order process according to the second embodiment.

In step S3601, the CPU 201 in the orderer terminal 103 initiates the web browser 602. Using the keyboard 206 and/or the pointing device 207, an orderer inputs a sales screen displaying URL "http://www.server.jp/cgi/view?cd=XXX" (see the CGI 406 in FIG. 4). In response to a command from the web browser 602, the CPU 201 in the orderer terminal 103 sends an HTTP request containing the sales screen displaying URL to the support server 101 via the Internet 102.

Upon receiving a command from the web server program 305, the CPU 201 in the support server 101 receives the HTTP request, and associates the sales screen displaying URL with the CGI program 306 "view" on a one-to-one basis (see the CGI 406 in FIG. 4).

In step S3602, the CPU 201 in the support server 101 outputs HTML data for generating the sales screen in response to the CGI program 306 "view".

Figure 37:
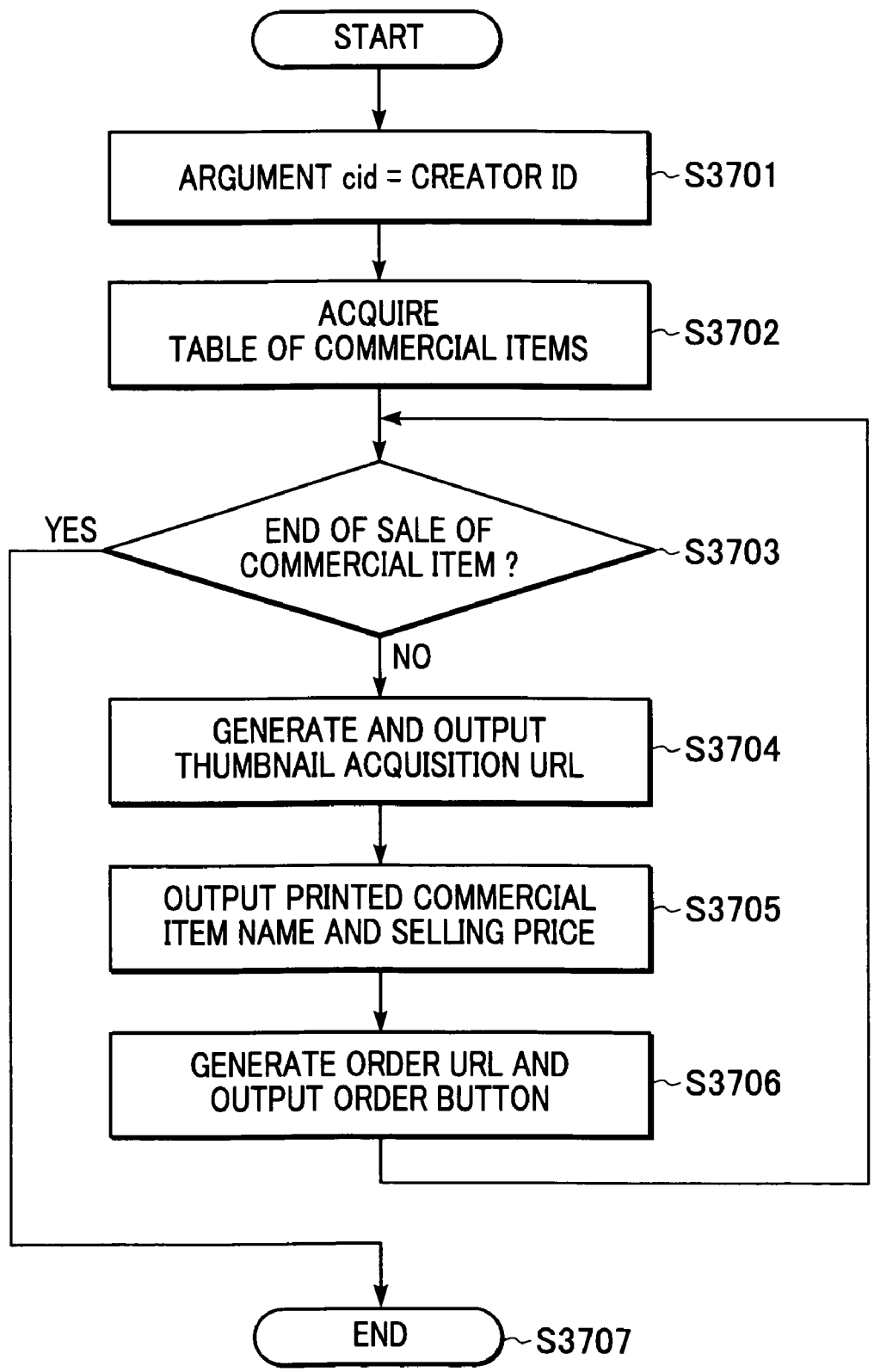
FIG. 37 is a flowchart of a process for generating the sales screen.

The above process will now be discussed with reference to a flowchart shown in FIG. 37.

In step S3701, the CPU 201 in the support server 101 input the argument of the HTTP request to the CGI program 306 "view" on command from the web server program 305. The argument here is "cid=XXX", where the "XXX" represents a creator ID. The CPU 201 in the support server 101 outputs a head portion of the HTML data in response to a command from the CGI program 306 "view".

In step S3702, in response to a command from the CGI program 306 "view" and a command from the database program 308, the CPU 201 in the support server 101 searches the commercial item database 303 using the creator ID "XXX" acquired in step S3701 as a key. In accordance with the second preferred embodiment, the table of records shown in FIG. 25 is obtained.

In step S3703, in response to a command from the CGI program 306 "view", the CPU 201 in the support server 101 determines whether all steps of the sale of a commercial item (S3704-S3706) have been completed in connection with the table of commercial items acquired in step S3702. If it is determined that all steps have been completed, the CPU 201 in the support server 101 proceeds to step S3707 and the process ends. If it is determined that all steps have not been completed, the CPU 201 in the support server 101 selects one commercial item from among a list of unprocessed commercial items and proceeds to step S3704. Here, the CPU 201 in the support server 101 selects the commercial item 2501 as shown in FIG. 25.

In step S3704, the CPU 201 in the support server 101 generates a thumbnail acquisition URL of the commercial item 2501 selected in step S3703, and output HTML data.

In step S3705, the CPU 201 in the support server 101 outputs the HTML data to display the input area of the output medium name, the selling price, and the order quantity of the commercial item selected in step S3703. In response to a command from the CGI program 306 "view" and a command from the database program 308, the CPU 201 in the support server 101 searches the output medium database 301 using the output medium code "TS-W-S" of the commercial item 2501 as a key, and outputs the HTML data to display the output medium name "T-shirt (white) small" and the selling price "40" obtained from the found record 1001 (see FIG. 10). The CPU 201 in the support server 101 acquires "set (1 set=1 unit)" from the name of unit of orders, the name of unit of commercial items, and the number of commercial items per purchase order and outputs HTML data to display the "set (1 set=1 unit)"

In step S3706, the CPU 201 in the support server 101 generates an order URL of the commercial item selected in step S3703, and outputs HTML data to display an order button linked to the URL. Since the call format of the order CGI 407 (see FIG. 4) takes the creator ID designated by the argument name "cid=" and the commercial item ID designated by the argument name "pid=", the order URL becomes "http://www.server.jp/cgi/order1?cid=XXX&pid=1001" in accordance with the creator ID "XXX" acquired in step S3701 and the commercial item ID "1001" of the commercial item 2501 selected in step S3703. The CPU 201 in the support server 101 outputs HTML data of the order button for calling the generated order URL. One example of the HTML data is described below:

```
<TD>
<FORM ACTION=
"http://www.server.jp/cgi/order3?cid=XXX&pid=1001"
<INPUT TYPE= "SUBMIT" VALUE=" Put into cart"/>
</FORM>
</TD>
</TR>
```

The CPU 201 in the support server 101 returns to step S3703 to perform the same process for all unprocessed commercial items.

In step S3707, the CPU 201 in the support server 101 outputs a tail portion of the HTML data when all steps have been completed.

In this way, the CPU 201 in the support server 101 outputs the HTML data.

In response to a command from the web server program 305, the CPU 201 in the support server 101 sends to the orderer terminal 103, via the Internet 102, an HTTP response having the output HTML data as the body thereof. In response to a command from the web browser 602, the CPU 201 in the orderer terminal 103 receives the HTTP response, and renders the HTML data as the body of the HTTP response on the display 205 of the orderer terminal 103. FIG. 33 illustrates the rendered HTTP response.

Turning back to FIG. 36, in step S3603, the orderer inputs the selection input of order button 3303, 3306, 3309, or 3312 on the sales screen 3300 shown in FIG. 33 provided on the Web browser 602 using the keyboard 206 and/or the pointing device 207. Upon receiving a command from the web browser 602, the CPU 201 in the orderer terminal 103 sends to the support server 101, via the Internet 102, an HTTP request containing a link destination URL designated by the order buttons 3303, 3306, 3309, or 3312.

For example, the order button 3303 shown in FIG. 33 is associated with the link destination URL "http://www.server.jp/cgi/order3?cid=XXX&pid=1001". If the order button 3303 is selected, the CPU 201 in the orderer terminal 103 sends to the support server 101, via the Internet 102, the URL and the HTTP request containing the value input in the order quantity field 3313 as the argument. In response to a command from the web server program 305, the CPU 201 in the support server 101 receives the HTTP request, and associates the URL with the CGI program 306 "order3" on a one-to-one basis.

In step S3604, in response to a command from the CGI program 306 "order3", the CPU 201 in the support server 101 instructs the output apparatus to output the commercial items represented by the argument "pid=1001" contained in the URL by the order quantity also designated by the argument. In response to the command from the support server 101, the output apparatus produces the commercial items. The commercial item of "pid=1001" is produced by outputting the copyrighted data to the output medium represented by the output medium code "TS-W-S".

In step S3605, the CPU 201 in the support server 101 receives a command from the CGI program 306 "order3", thereby checking to see whether a session with the orderer terminal 103 is initiated.

If a session is not initiated, the CPU 201 in the support server 101 issues a new unique order ID, and adds a new record (see FIG. 13) to the order database 304 in response to a command from the database program 308. The CPU 201 in the support server 101 sets the newly issued order ID to the order ID 1301 of the newly added record, the creator ID "XXX" designated by the argument "cid=XXX" to the creator ID 1302 of the newly added record, and the commercial item ID "1001" designated by the argument "cid=1001" to the commercial item ID #1 (1306) of the newly added record.

If a session is initiated, the order ID is already attached as cookie as will be discussed below. In response to a command from the CGI program 306 "order3", the CPU 201 in the support server 101 acquires the order ID from the HTTP request using the cookie. The CPU 201 in the support server 101 searches the records of the order database 304 using the order ID as a key in response to a command from the CGI program 306 "order3" and a command from the database program 308. In response to a command from the CGI program 306 "order3", the CPU 201 in the support server 101 compares the creator ID 1302 of the found record (see FIG. 13) with the creator ID "XXX" designated by the argument "cid=XXX".

If the creator IDs fail to match, the order ID is already associated with the commercial item of another creator. The CPU 201 in the support server 101 issues a new order ID in the same manner as the new order previously discussed.

If the creator IDs match each other, the CPU 201 in the support server 101 adds the commercial item ID "1001" designated by the argument "pid=1001" to the found record. For example, if a commercial item #1, a commercial item #2, and a commercial item #3 are present in the found record, the CPU 201 in the support server 101 adds the commercial item represented by "pid=1001" as a commercial item #4 (see FIG. 13).

In step S3606, the CPU 201 in the support server 101 receives a command from the CGI program 306 "order3" and outputs HTML data representing a delivery destination screen 3400 that receives the delivery destination of the commercial item as shown in FIG. 34. In response to a command from the web server program 305, the CPU 201 in the support server 101 sends to the orderer terminal 103, via the Internet 102, an HTTP response having delivery destination screen displaying HTML data as the body thereof. In response to a command from the CGI program 306 "order3", the CPU 201 in the support server 101 attaches the order ID to the HTTP response as cookie. In response to a command from the web browser 602, the CPU 201 in the orderer terminal 103 receives the HTTP response, and renders the delivery destination screen displaying HTML data as the body of the HTTP response on the display 205 of the orderer terminal 103. In response to a command from the web browser 602, the CPU 201 in the orderer terminal 103 stores the attached cookie onto the internal memory 202 or the external storage device 204.

FIG. 34 illustrates the rendered delivery destination screen displaying HTML data. A delivery destination screen 3400 is constructed using the form function of the HTML. An input field 3409 is for the address of delivery destination, an input field 3410 is for the name of addressee, and an input field 3411 is for the telephone number of the addressee. Designated here as a destination URL of the HTTP request is a delivery destination input URL "http://www.server.jp/cgi/order4" (see the CGI 408 in FIG. 4).

In step S3607, the orderer selects an "Order" button 3412 using the keyboard 206 and/or the pointing device 207. In response to a command from the web browser 602, the CPU 201 in the orderer terminal 103 sends to the support server 101, via the Internet 102, the delivery destination input URL "http://www.server.jp/cig/order4" (see the CGI 407 in FIG. 4) and an HTTP request having character strings input in the input fields 3409-3411 as the arguments.

In response to a command from the web server program 305, the CPU 201 in the support server 101 receives the HTTP request, and associates the delivery destination input URL with the CGI program 306 "order4" on a one-to-one basis (see the CGI 408 in FIG. 4).

In step S3608, the CPU 201 in the support server 101 inputs the arguments of the HTTP request to the CGI program 306 "order4". Input here is "Imaiuemachi Nakahara-ku Kawasaki-shi" as the address of the delivery destination, "Hanako Kosugi" as the name of the addressee, and "044-xxx-xxxx" as the telephone number of the addressee.

Since the session is initiated in step S3605, the CPU 201 in the support server 101 receives a command from the CGI program 306 "order4", and acquires the order ID from the HTTP request using the cookie. In response to a command from the CGI program 306 "order4" and a command from the database program 308, the CPU 201 in the support server 101 searches the records of the order database 304 using the acquired order ID as a key. A record shown in FIG. 35 is acquired. In response to a command from the CGI program 306 "order4", the CPU 201 in the support server 101 registers the delivery destination "Imaiuemachi Nakahara-ku Kawasaki-shi" of the argument as the delivery destination 3503, the name of the addressee "Hanako Kosugi" of the argument as the name of the addressee 3504, the telephone number of the addressee "044-733-6111" as the telephone number of the addressee 3505.

The sum of purchase, the consumption tax, and the sum of cost may be calculated and registered in the record.

In step S3609, the CPU 201 in the support server 101 communicates with a computer of a delivery company of the commercial items via a network in response to a command from the CGI program 306 "order4". The CPU 201 in the support server 101 notifies the computer of the delivery company of the order ID and the content of the "address of the delivery destination" 1303, the "name of the addressee" 1304, and the "telephone number of the addressee" 1305, and instructs the computer of the delivery company to deliver, to the delivery destination, the commercial item matching the order ID and already produced by the output apparatus. In response to the delivery command from the support server 101, the computer of the delivery company prints the "address of the delivery destination" 1303, the "name of the addressee" 1304, the "telephone number of the addressee" 1305, etc. on an invoice using a printer connected thereto. The computer of the company may also display the "delivery destination" 1304, the "name of the addressee" 1304, the "telephone number of the addressee" 1305, etc. on a display. The company then packs and ships the commercial items.

A storage medium storing a program code of software for carrying out the functions of the above-described preferred embodiments is loaded in a system or apparatus. A computer (a CPU or an MPU) in the system or apparatus reads and executes the program code from the storage medium, thus achieving the object of the present invention. Since the program code of software performs the functions of the above-described preferred embodiment, the program code itself, and means for providing the program code to the computer, for example, a storage medium for storing the program code, fall within the scope of the present invention. By executing the program code read by the computer, the functions of the above-described embodiments are performed. The operating system running on the computer performs the process in whole or in part in response to instructions from the program code. The functions of the above preferred embodiments are thus carried out. Such an arrangement falls within the scope of the present invention.

The program code from the storage medium is read into a memory incorporated in a feature expansion board in the computer or in a feature expansion unit connected to the computer. The CPU mounted on the feature expansion board or the feature expansion unit performs partially or entirely the actual process in response to the instruction from the program code. The functions of the above-described preferred embodiments are executed through the process. Such a program code falls within the scope of the present invention.

In accordance with the present invention, the support server sets the location of the commercial item on the network based on information relating to the manner in which content data received from the first information processing apparatus is output to the commercial item. The support server also detects an access of the second information processing apparatus to the location. The commercial item is thus produced and supplied to a purchaser. On-line sales are performed by constructing an environment appropriate for the creator, without imposing, on the creator, the workload involved in the construction and operation of the on-line sales system, without the risk of stocking unsold commercial items, and without the need for time for constructing a sales screen.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A commercial item sales system for selling, via the Internet, a commercial item manufactured by printing image data on a printing medium, the commercial item sales system comprising:

a first information processing apparatus;
a second information processing apparatus; and
an orderer terminal,
wherein the first information processing apparatus comprises:
a presentation unit configured to produce web page data and present the web page data to the orderer terminal, and
an upload unit configured to upload, to the second information processing apparatus, image data and commercial item information including information related to designation of the image data and the printing medium, and
wherein the second information processing apparatus comprises:
a register unit configured to receive, from the first information processing apparatus, the commercial item information, and register the commercial item information in association with identification information that uniquely identifies the first information processing apparatus,
a setting unit configured to set an address on the network for the commercial item information registered by the register unit,
a request receiving unit configured to receive, from the orderer terminal, a request based on an URL including the identification information as argument,
a generating unit configured to acquire, in response to the request, the address set for the commercial item information associated with the identification information included as argument in the URL used for the request, and generate a sales screen including the acquired address,
a transmitting unit configured to transmit the sales screen generated by the generating unit to the orderer terminal,
an order receiving unit configured to receive, from the orderer terminal, an order based on the address included in the sales screen, and
an instruction unit configured to instruct a printing apparatus to print the designated image data uploaded by the uploading unit on the designated printing medium based on the commercial item information for which the address is set.

2. The commercial item sales system according to claim 1, wherein the first information processing apparatus further comprises a providing unit configured to provide the second information processing apparatus with a sample image in which image data uploaded by the uploading unit is combined with an image on a printing medium designated based on the commercial item information registered by the register unit.

* * * * *